US010643220B2

(12) United States Patent
Yuki

(10) Patent No.: US 10,643,220 B2
(45) Date of Patent: May 5, 2020

(54) IMAGE FORMING APPARATUS, LICENSE SERVER, LICENSE MANAGEMENT SYSTEM AND CONTROLLING METHOD

(71) Applicant: CANON KABUSHIKI KAISHA, Tokyo (JP)

(72) Inventor: Naoto Yuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 15/375,531

(22) Filed: Dec. 12, 2016

(65) Prior Publication Data
US 2017/0200169 A1    Jul. 13, 2017

(30) Foreign Application Priority Data
Jan. 7, 2016 (JP) .................................. 2016-001603

(51) Int. Cl.
*G06Q 30/00* (2012.01)
*G06F 21/10* (2013.01)

(52) U.S. Cl.
CPC .......... *G06Q 30/018* (2013.01); *G06F 21/10* (2013.01); *G06F 21/105* (2013.01); *G06F 2221/0768* (2013.01)

(58) Field of Classification Search
CPC ..... G06Q 30/018; G06F 21/10; G06F 21/105; G06F 2221/0768
See application file for complete search history.

(56) References Cited

U.S. PATENT DOCUMENTS

| 7,024,393 B1 | 4/2006 | Peinado et al. | |
| 7,702,536 B1 * | 4/2010 | Alabraba | G06Q 30/02 705/14.16 |
| 8,079,090 B2 * | 12/2011 | Okada | G06F 21/12 726/27 |

(Continued)

FOREIGN PATENT DOCUMENTS

| EP | 1933251 A1 * | 6/2008 | ............. G06F 21/12 |
| JP | 2001-312325 | 11/2001 | |

(Continued)

OTHER PUBLICATIONS

Veerubhotla et al., A DRM Framework Towards Preventing Digital Piracy, IEEE, all pages. (Year: 2011).*

(Continued)

*Primary Examiner* — Jacob C. Coppola
(74) *Attorney, Agent, or Firm* — Venable LLP

(57) ABSTRACT

In case of an initial setting operation before shipping an image forming apparatus, since a using period is out of the contract duration, the application is unavailable at the time of the initial setting operation. A license server issues a first license for setting of the application in addition to a second license regarding the contract duration of the application. When the first license is received from the license server, if the present date is within the usage period for the setting operation, the application is available for such a period, and if the present date is outside of such a period, the apparatus acquires the second license from the license server. When the second license is received from the license server, the image forming apparatus makes the application available for the contract duration.

4 Claims, 14 Drawing Sheets

(56) References Cited

U.S. PATENT DOCUMENTS

| | | | | |
|---|---|---|---|---|
| 9,026,626 B2* | 5/2015 | Asahara | ................ | G06F 21/105 709/220 |
| 10,503,877 B2* | 12/2019 | Mazza | .................... | G06F 21/10 |
| 2001/0037403 A1* | 11/2001 | Mougi | .................... | G06F 21/10 709/238 |
| 2002/0107809 A1* | 8/2002 | Biddle | .................. | G06Q 10/10 705/59 |
| 2002/0138441 A1* | 9/2002 | Lopatic | ................. | G06F 21/125 705/59 |
| 2005/0021477 A1* | 1/2005 | Krishnan | ............ | G06F 9/44521 705/64 |
| 2006/0200420 A1* | 9/2006 | Osada | ..................... | G06F 21/10 705/59 |
| 2007/0006324 A1* | 1/2007 | Osada | ..................... | G06F 21/10 726/27 |
| 2008/0215468 A1* | 9/2008 | Monsa-Chermon | ... | G06Q 10/00 705/34 |
| 2008/0235803 A1* | 9/2008 | Harada | ................... | G06F 21/10 726/26 |
| 2009/0055320 A1* | 2/2009 | Goertler | ................ | G06F 19/328 705/59 |
| 2009/0091787 A1* | 4/2009 | Naitoh | .................... | G06F 21/10 358/1.15 |
| 2009/0133128 A1* | 5/2009 | Uchikawa | ............... | G06F 21/10 726/27 |
| 2009/0241107 A1* | 9/2009 | Kobayashi | ............. | G06F 21/10 717/178 |
| 2010/0071069 A1* | 3/2010 | Sugiura | ................ | G06F 21/105 726/26 |
| 2011/0041125 A1* | 2/2011 | Sugiura | .................. | G06F 21/10 717/176 |
| 2011/0055825 A1* | 3/2011 | Ikawa | ................... | G06F 21/105 717/176 |
| 2011/0066721 A1* | 3/2011 | Shinomiya | .............. | G06F 21/10 709/224 |
| 2011/0066886 A1* | 3/2011 | Sugiura | ................. | G06Q 30/00 714/16 |
| 2011/0125655 A1 | 5/2011 | Chiyo et al. | | |
| 2011/0276501 A1 | 11/2011 | Sako et al. | | |
| 2013/0111564 A1 | 5/2013 | Jin | ................................... | 726/4 |
| 2014/0082608 A1* | 3/2014 | Hayami | ................. | G06F 13/12 717/175 |
| 2014/0173762 A1* | 6/2014 | Sugiura | ................. | G06Q 30/00 726/30 |
| 2014/0211218 A1* | 7/2014 | Yuki | .................... | H04N 1/4426 358/1.5 |

FOREIGN PATENT DOCUMENTS

| | | |
|---|---|---|
| JP | 2009-177383 | 8/2009 |
| JP | 2011-065296 | 3/2011 |
| JP | 5454102 B2 | 3/2014 |
| JP | 2015-121919 | 7/2015 |
| WO | 00/58811 A2 | 10/2000 |
| WO | 2010/092655 A1 | 8/2010 |

OTHER PUBLICATIONS

Extended European Search Report dated May 12, 2017, in counterpart EP application No. 16204032.3 (7 pages).

Office Action dated Oct. 24, 2019 in counterpart Japanese Application No. 2016-001603, together with English Translation thereof.

* cited by examiner

FIG. 4

401 INSTALL SCREEN

IN CASE OF ONLINE INSTALL, INPUT LICENSE ACCESS NUMBER, AND CLICK ONLINE INSTALL BUTTON

IN CASE OF OFFLINE INSTALL, DESIGNATE APPLICATION FILE AND LICENSE, AND CLICK OFFLINE INSTALL BUTTON

| LICENSE ACCESS NUMBER | | ~402 |

ONLINE INSTALL ~405

| APPLICATION FILE | | ~403 |
| LICENSE | | ~404 |

OFFLINE INSTALL ~406

FIG. 5

501 USE INFORMATION REGISTRATION

INPUT LICENSE ACCESS NUMBER AND USE INFORMATION OF ITEM OF WHICH USE INFORMATION IS TO BE REGISTERED

| LICENSE ACCESS NUMBER | | ~502 |

USE INFORMATION

| DEVICE SERIAL NUMBER | | ~503 |
| USAGE STARTING DATE | | ~504 |
| USAGE ENDING DATE | | ~505 |

REGISTER ~506

IMAGE FORMING APPARATUS, LICENSE SERVER, LICENSE MANAGEMENT SYSTEM AND CONTROLLING METHOD

BACKGROUND OF THE INVENTION

Field of the Invention

The present invention relates to a technique for license management.

Description of the Related Art

Fundamental functions such as copy function, print function, scan function, and the like have been installed as standard functions in an image forming apparatus and there is a case where an extended function is prepared as an option. Generally, the user who wants to use such an extended function can use it by purchasing a license of the extended function. It is a normal practice that the user can use such a function only for a contract term by continuously paying a usage fee or the like. For example, as disclosed in Japanese Patent No. 05454102, when a next payment is confirmed, by applying a license adapted to extend a contract term of usage of the extended function to the image forming apparatus, the customer can use the extended function for a period of time during which he pays the usage fee.

SUMMARY OF THE INVENTION

However, with respect to the image forming apparatus, there is a case where when it is delivered to the customer side, an initial setting operation is preliminarily performed so that the customer can use it immediately. In the initial setting operation, an installation of the extended function, setting values, a test to check whether or not the apparatus actually operates, and the like are executed. On the other hand, in Japanese Patent No. 05454102, there is a problem that since the extended function can be used only from a date when the customer has made a contract, an installation/setting operation of the extended function cannot be executed for a period of time of the initial setting operation before the contract term.

It is an aspect of the invention to address the foregoing problem and to provide such a license management that an installation/setting operation of an extended function can be executed for a period of time of an initial setting operation before a contract with the customer is made and, when the contract with the customer is made, a license is automatically updated to a license which becomes available for a contract term.

According to an aspect of the invention, an image forming apparatus communicates with a license server, wherein: the license server holds an application and issues a license of the application; the license includes first and second licenses, the second license has information indicating a contract term of the application in the image forming apparatus, and the first license has information indicating a using period which makes the application available for the purpose of setting in the image forming apparatus before the contract term; the image forming apparatus comprises a holding unit configured to receive the application and the license from the license server and hold and a controlling unit configured to control in such a manner that when the license held in the holding unit is the first license, if a present date is within the using period, the application is made available for the using period, and if the present date expires the using period, the second license is acquired from the license server and held in the holding unit; and when the license held in the holding unit is the second license, the controlling unit makes the application available for the contract term.

According to the aspect of the invention, even before the contract with the customer is made, the initial setting operation such as installation, setting, and the like of the extended function can be performed. When the contract with the customer is made, the license can be automatically updated to the license which can use the extended function only for the contract term.

Further features of the present invention will become apparent from the following description of exemplary embodiments with reference to the attached drawings.

BRIEF DESCRIPTION OF THE DRAWINGS

FIG. 4 is a diagram illustrating an example of an image which is provided by an image forming apparatus according to the embodiment of the invention.

FIG. 5 is a diagram illustrating an example of an image which is provided by a license server according to the embodiment of the invention.

DESCRIPTION OF THE EMBODIMENTS

Preferred embodiments of the present invention will now be described in detail in accordance with the accompanying drawings. First, terminologies are defined.

"Application file" is a file in which a program as an extended function of an image forming apparatus has been stored. The application file is not held as a standard file in the image forming apparatus but, at the time of initial setting, the image forming apparatus receives such an application file as an install request together with a license, which will be described hereinafter, so that the application file is stored in a hard disk of the image forming apparatus. In order to install or use the application file, a license, which will be described hereinafter, is necessary.

"License" is a file necessary to permit an installation or usage of the application file to the image forming apparatus. As licenses, an install license (first license) and an update license (second license) exist. The install license is a license to permit an installation of the application file and a usage of the application file limited to the specific number of days to the image forming apparatus before start of a contract. The update license is a license to permit an installation of the application file and a usage of the application file in a contract term.

Figure 1:
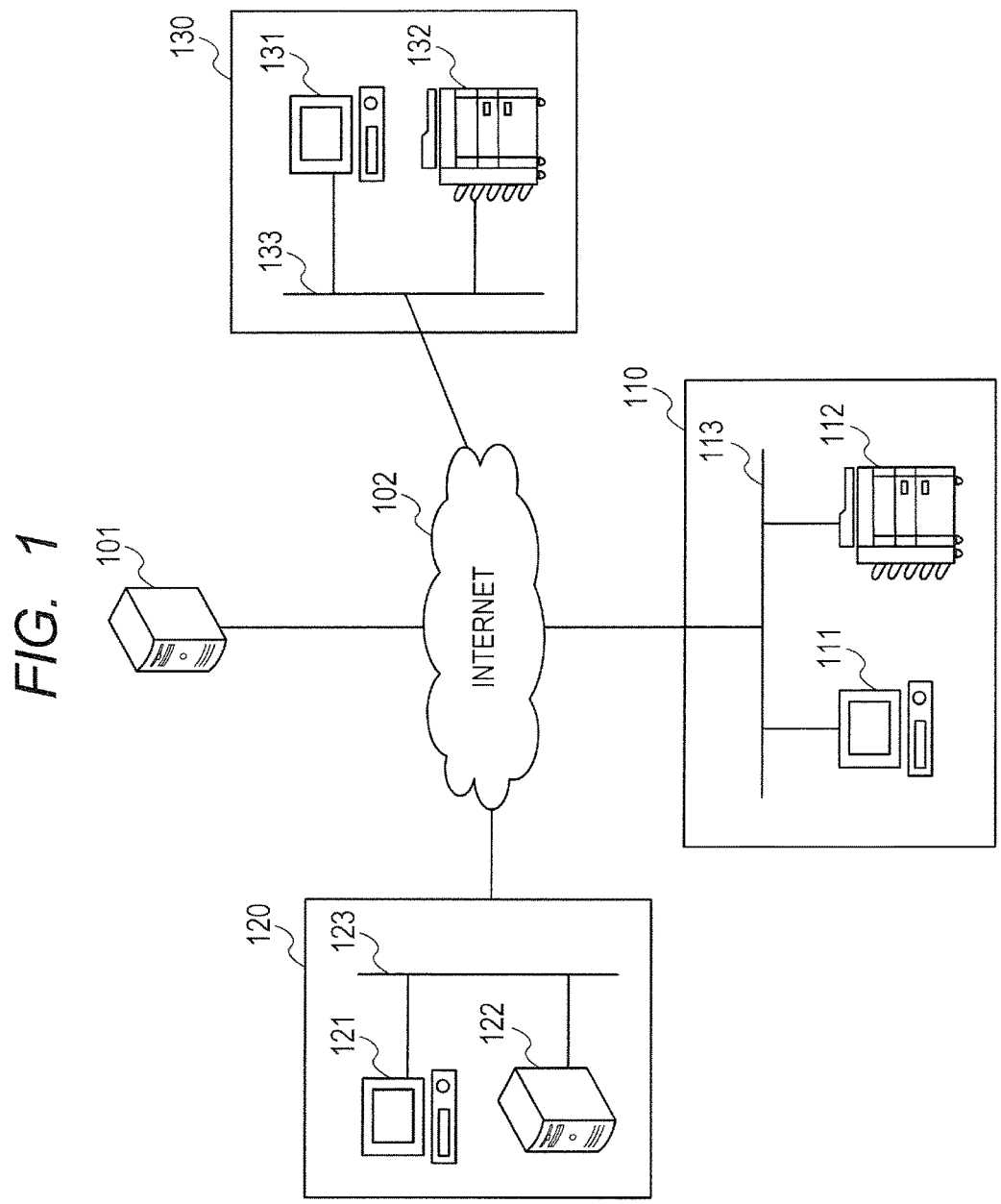
FIG. 1 is a diagram illustrating a network configuration according to an embodiment of the invention.

A network configuration of a license management system to which the invention is applied is illustrated in FIG. 1. A license server 101 is a server which can issue a license and can communicate with various kinds of apparatuses via Internet 102. Although image forming apparatuses (112, 132) and information processing apparatuses (111, 121, 131) are connected to a network one by one in an example of FIG. 1, a plurality of apparatuses may be connected.

A customer network environment 110 is a network environment of the customer who purchased the image forming apparatus 112. In the customer network environment 110, the image forming apparatus 112 and the information processing apparatus 111 are connected via a LAN (Local Area Network) 113. The LAN 113 can be connected to the Internet 102. A distributor firm network environment 120 is a network environment of the distributor firm which sells the extended function. In the distributor firm network environment 120, the information processing apparatus 121 and a contract server 122 are connected via a LAN 123. The LAN 123 can be connected to the Internet 102.

An installed factory network environment 130 is a network environment of the installed factory for performing the initial setting of the image forming apparatus 132. In the installed factory network environment 130, the information processing apparatus 131 and the image forming apparatus 132 whose initial setting is performed are connected via a LAN 133. The LAN 133 can be connected to the Internet 102. After the initial setting operation was completed, the image forming apparatus 132 is conveyed to the customer from the installed factory, is connected to the customer network environment 110, and is used as an image forming apparatus 112.

Figure 2A:
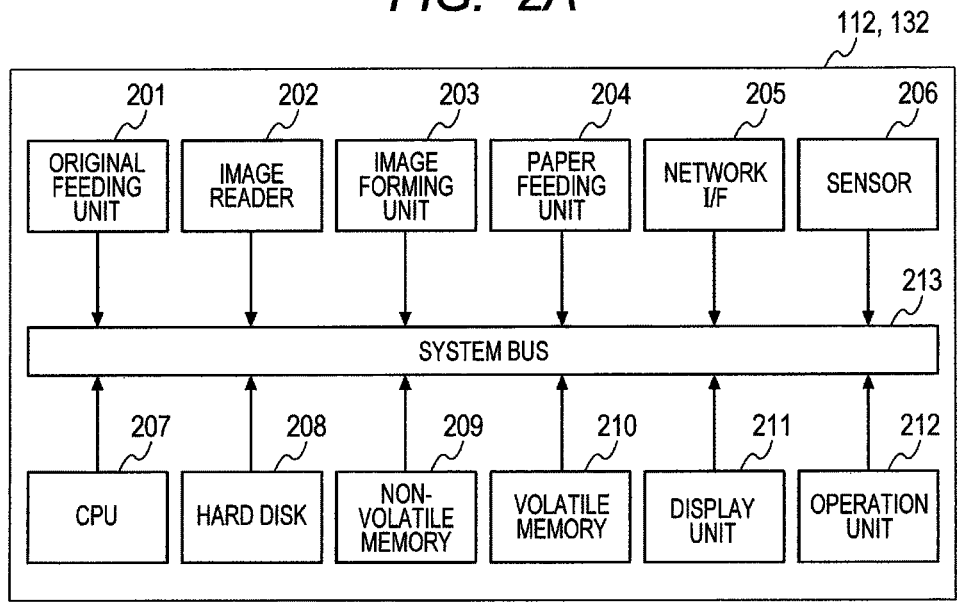
FIGS. 2A and 2B are diagrams illustrating a hardware configuration according to the embodiment of the invention.
Figure 2B:
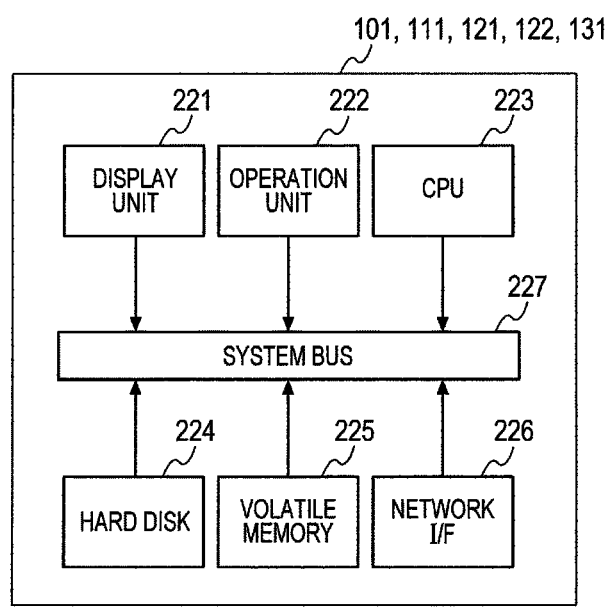

A hardware configuration of the license management system to which the invention is applied is illustrated in FIGS. 2A and 2B. FIG. 2A illustrates a hardware configuration of the image forming apparatuses 112 and 132. FIG. 2B illustrates a hardware configuration of the information processing apparatuses 111, 121, and 131, contract server 122, and license server 101.

As illustrated in FIG. 2A, the image forming apparatuses 112 and 132 include the following component elements 201 to 213. An original feeding unit 201 automatically feeds an original to be read to an image reader 202. The image reader 202 (for example, scanner) reads a fed original. An image forming unit 203 converts the read original and received data into print images and prints. A paper feeding unit 204 feeds paper for printing. A network I/F (interface) 205 is connected to the LANS 113 and 133 and the Internet 102 via the network and exchanges information to/from the outside. A sensor 206 detects a state of each unit of the apparatus. A CPU 207 executes each processing on the apparatus. A hard disk 208 stores a program and data regarding each processing on the apparatus. A non-volatile memory 209 is a memory in which stored data can be held and rewritten even if a power source is not supplied. For example, the memory 209 is an FRAM (Ferroelectric Random Access Memory). A volatile memory 210 is a memory in which temporary data regarding each processing on the apparatus can be electrically stored and rewritten. A display unit 211 displays an operation situation of the apparatus and information regarding the operation to an operation unit 212. The operation unit 212 receives an instruction input to the apparatus. A system bus 213 connects the respective component units 201 to 212 and transmits and receives data among them.

As illustrated in FIG. 2B, the information processing apparatuses 111, 121, and 131, contract server 122, and license server 101 include the following component elements 221 to 227. A display unit 221 displays windows, icons, messages, menus, and other user interface information. An operation unit 222 receives an input of the end user who uses a keyboard and a mouse. A CPU 223 executes each processing on the apparatus. A hard disk 224 stores a program and data regarding each processing on the apparatus. A volatile memory 225 is a memory in which temporary data regarding each processing on the apparatus can be electrically stored and rewritten. A network I/F 226 is connected to the LANS 113, 123, and 133 and the Internet 102 via the network and exchanges information to/from the outside. A system bus 227 connects the respective component units 221 to 226 and transmits and receives data among them.

Figure 3A:
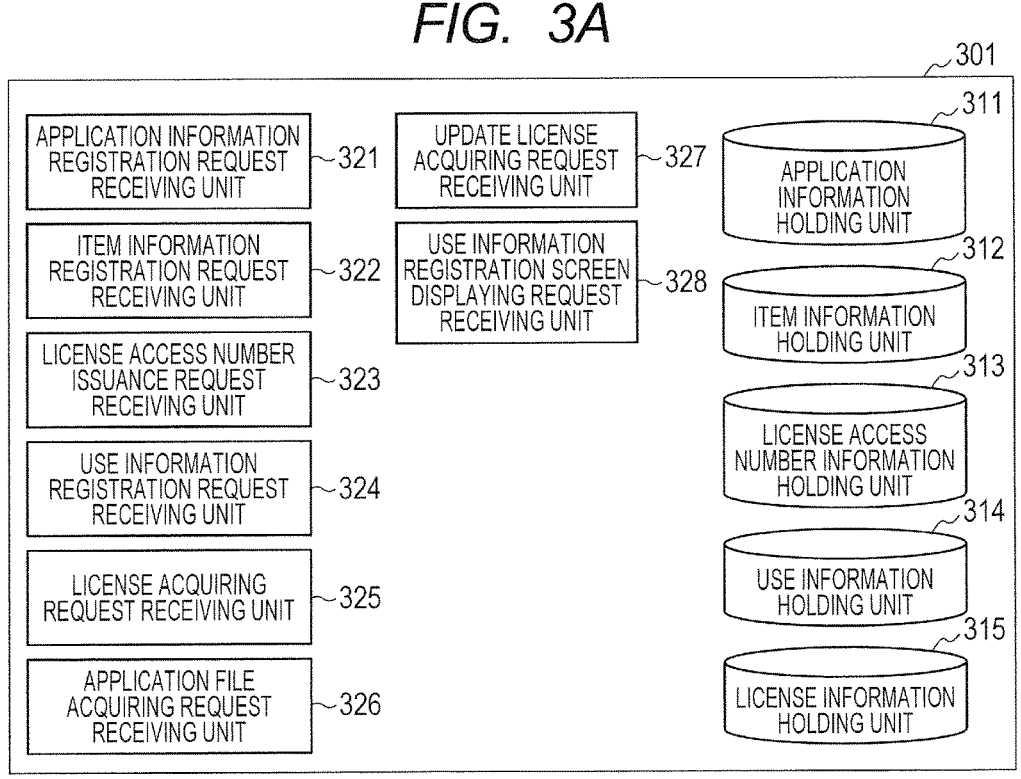
FIGS. 3A and 3B are diagrams illustrating a software configuration according to the embodiment of the invention.
Figure 3B:
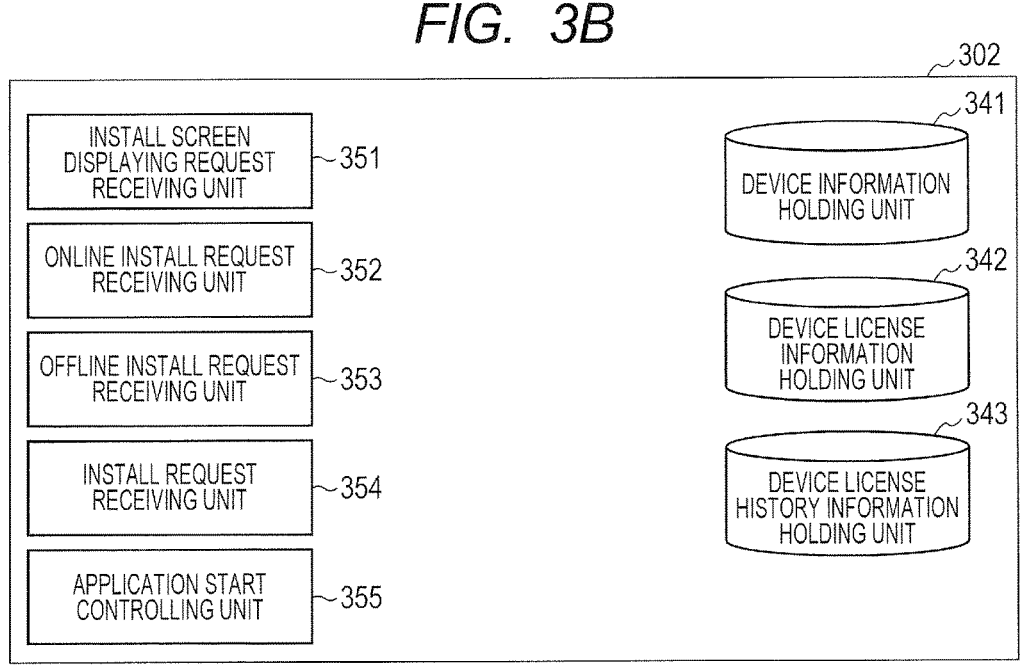

A software configuration of the license management system to which the invention is applied is illustrated in FIGS. 3A and 3B. FIG. 3A is a diagram illustrating a software configuration 301 of the license server 101. FIG. 3B is a diagram illustrating a software configuration 302 of the image forming apparatuses 112 and 132.

Each unit of the software configuration 301 in FIG. 3A is executed by a method whereby, in the license server 101, the CPU 223 loads the program stored in the hard disk 224 into the volatile memory 225.

An application information holding unit 311 is a unit for holding an application information table into the hard disk 224 of the license server 101. An example of the application information table which is stored in the application information holding unit 311 is illustrated in Table A.

TABLE A

| Application information table | | | |
|---|---|---|---|
| APPLICATION ID | APPLICATION VERSION | APPLICATION NAME | FILE PATH |
| app001 | 3.0 | Anyplace Print | /apps/anyplace_3.0.jar |
| app002 | 2.1 | Seiton FAX | /apps/seiton_2.1.jar |
| app003 | 1.3 | Erande my print | /apps/myprint_1.3.jar |

In the application information table of Table A, an application ID column is a column for storing an application ID as an identifier to uniquely identify a kind of application file. An application version column is a column for storing a version of the application file. The application file can be uniquely identified by the application ID and the application version. An application name column is a column for storing an application name. A file path column is a column for storing a path in which the application file has been stored. Each record in the application information table is called an application information record and is registered in the table on an application unit basis. The application information record is added when an application information registration request receiving unit 321, which will be described hereinafter, receives a request to register application information.

An item information holding unit 312 is a unit for holding an item information table which holds item information into the hard disk 224 of the license server 101. The item information is a unit by which the application file is sold. The customer purchases an item on the item information unit basis. An example of the item information table stored in the item information holding unit 312 is shown in Table B.

TABLE B

Item information table

| ITEM ID | ITEM NAME | APPLICATION ID |
|---|---|---|
| P0002 | Anyplace Print | app001 |
| P0004 | Seiton FAX | app002 |
| P0006 | VNC | app003 |

In the item information table of Table B, an item ID column is a column for storing an item ID as an identifier to uniquely identify the item. An item name column is a column for storing an item name. An application ID column is a column for storing an application ID of an application file which becomes available when the customer purchases the item. Each record in the item information table is called an item information record and is registered in the table on the item unit basis. The item information record is added when an item information registration request receiving unit 322, which will be described hereinafter, receives a request to register item information. Although the embodiment will be described with respect to an example in which one application information is associated with one item information, a plurality of application information may be associated with one item information. In such a case, by purchasing one item, the customer can use the application files of a plurality of application information associated with one item information.

A license access number information holding unit 313 is a unit for holding a license access number information table to hold license access number information into the hard disk 224 of the license server 101. The license access number is data necessary to acquire the application file and the license from the license server 101 via the Internet 102. An example of the license access number information table stored in the license access number information holding unit 313 is shown in Table C.

TABLE C

License access number information table

| LINCENSE ACCESS NUMBER | ITEM ID |
|---|---|
| LA01 | P0002 |
| LA02 | P0004 |
| LA03 | P0006 |

In the license access number information table of Table C, a license access number column is a column for storing a license access number. An item ID column is a column for storing an item ID of an item which becomes available by the license access number. Each record in the license access number information table is called a license access number information record. The license access number information record is added on a unit basis by which the license access number is issued by a license access number issuance request receiving unit 323, which will be described hereinafter. It is assumed that one license access number can be issued for one item.

A use information holding unit 314 is a unit for holding a use information table to hold use information into the hard disk 224 of the license server 101. The use information is information of a contract made between the customer and the distributor firm, and information showing for which period of time the image forming apparatus purchased by the customer is allowed to use the item is held. An example of the use information table stored in the use information holding unit 314 is shown in Table D.

TABLE D

Use information table

| LINCENSE ACCESS NUMBER | DEVICE SERIAL NUMBER | USAGE STARTING DATE | USAGE ENDING DATE |
|---|---|---|---|
| LA01 | AAA00130 | 2015 Sep. 1 | 2015 Dec. 31 |
| LA02 | AAA00130 | 2015 Sep. 1 | 2015 Dec. 31 |
| LA03 | AAA00130 | 2015 Sep. 1 | 2015 Dec. 31 |

In the use information table of Table D, a license access number column is a column for storing a license access number of an item in which a contract with the customer has been made. A device serial number column is a column for storing a device serial number of an image forming apparatus in which a contract with the customer has been made. A usage starting date column is a column for storing a usage starting date of a term of a contract made with the customer. A usage ending date column is a column for storing a usage ending date of a term of a contract made with the customer. A record in a use information table is called a use information record. The use information record is added on a unit basis by which the use information is registered by a use information registration request receiving unit 324, which will be described hereinafter. Table D is an example in the case where the distributor firm made a contract of a term from Sep. 1, 2015, to Dec. 31, 2015, with an image forming apparatus of a device serial number AAA00130 purchased by the customer with respect to items of license access numbers LA01, LA02, and LA03.

A license information holding unit 315 is a unit for holding a license information table to hold license information into the hard disk 224 of the license server 101. The license information is information of the install license and update license issued by the license server 101. An example of the license information table stored in the license information holding unit 315 is shown in Table E.

TABLE E

License information table

| LICENSE ACCESS NUMBER | DEVICE SERIAL NUMBER | LICENSE ID | STORAGE PATH |
|---|---|---|---|
| LA01 | * | LF00001 | /lic/LF00001.lic |
| LA02 | * | LF00007 | /lic/LF00007.lic |
| LA03 | * | LF00004 | /lic/LF00004.lic |
| LA01 | AAA00130 | LF00009 | /lic/LF00009.lic |
| LA02 | AAA00130 | LF00020 | /lic/LF00020lic |
| LA03 | AAA00130 | LF00027 | /lic/LF00027.lic |

In the license information table of Table E, a license access number column is a column for storing a license access number used when the license is issued. A device serial number column is a column for storing a device serial number which becomes available by the issued license. If the application file can be installed into all of the image forming apparatuses, "*" is stored. A license ID column is a column for storing a license ID as an identifier for uniquely identifying the license. A storage path column is a column for storing a path by which the issued license has been stored in the hard disk 224 of the license server 101. Each record in the license information table is called a license information record. The license information record is added on a unit basis by which the license is issued.

The application information registration request receiving unit 321 is a unit which is executed by receiving a request to register application information from the network I/F 226 provided for the license server 101. The application information registration request is transmitted from the information processing apparatus 121 of the distributor firm. The application information registration request receiving unit 321 acquires an application file 601 (FIGS. 6A to 6C) from the received application information registration request and stores into the hard disk 224. The application information registration request receiving unit 321 also acquires an application ID 602, an application name 603, and an application version 604 (FIGS. 6A to 6C) of the stored application file 601. The path of the stored application file 601 and the acquired application ID 602, application name 603, and application version 604 are added as a new application information record into the application information table of Table A.

The item information registration request receiving unit 322 is a unit which is executed by receiving a request to register item information from the network I/F 226 of the license server 101. The item information registration request is transmitted from the information processing apparatus 121 of the distributor firm. At least an item ID, an item name, an item type, and an application ID are included in the item information registration request. The item information registration request receiving unit 322 adds data acquired from the received item information registration request as a new item information record into the item information table.

The license access number issuance request receiving unit 323 is a unit which is executed by receiving a request to issue a license access number from the network I/F 226 provided for the license server 101. The license access number issuance request is transmitted from the information processing apparatus 121 of the distributor firm. At least an item ID is included in the license access number issuance request. The license access number issuance request receiving unit 323 issues a license access number and an install license to the item of the item ID included in the acquired license access number issuance request and returns them as a response. Details of a processing of the license access number issuance request receiving unit 323 will be described hereinafter with reference to a flowchart of FIG. 8.

The use information registration request receiving unit 324 is a unit which is executed by receiving a request to register use information from the network I/F 226 of the license server 101. The use information registration request is transmitted from the information processing apparatus 121 or the contract server 122 of the distributor firm. At least the license access number, device serial number, usage starting date, and usage end date are included in the use information registration request. The use information registration request receiving unit 324 issues an update license from information included in the acquired use information registration request. Details of a processing of the use information registration request receiving unit 324 will be described hereinafter with reference to a flowchart of FIG. 9.

A license acquiring request receiving unit 325 is a unit which is executed by receiving a request to acquire a license from the network I/F 226 of the license server 101. The license access number and the device serial number are included in the license acquiring request. The license acquiring request receiving unit 325 returns a license, as a response, corresponding to the acquired license access number and device serial number. Details of a processing of the license acquiring request receiving unit 325 will be described hereinafter with reference to a flowchart of FIG. 11.

An application file acquiring request receiving unit 326 is a unit which is executed by receiving a request to acquire an application file from the network I/F 226 provided for the license server 101. The license access number is included in the application file acquiring request. The application file acquiring request receiving unit 326 returns an application, as a response, associated with the license access number included in the acquired application file acquiring request.

Specifically speaking, the application file acquiring request receiving unit 326 acquires the license access number from the acquired application file acquiring request. Subsequently, the application file acquiring request receiving unit 326 acquires a license access number information record matching with the acquired license access number from the license access number information table of Table C. Then, the application file acquiring request receiving unit 326 acquires an item information record matching with the item ID of the acquired license access number information record from the item information table of Table B. Then, the application file acquiring request receiving unit 326 acquires an application ID from the acquired item information record. Then, the application file acquiring request receiving unit 326 acquires an application information record matching with the acquired application ID from the application information table of Table A. The application file acquiring request receiving unit 326 returns the application file 601, as a response, of a file path included in the acquired application information record.

An update license acquiring request receiving unit 327 is a unit which is executed by receiving a request to acquire an update license from the network I/F 226 of the license server 101. The device serial number and the application ID of the application file 601 in which the user wants to acquire the update license are included in the update license acquiring request. In the case where an update license exists in correspondence to the acquired device serial number and application ID, the update license acquiring request receiving unit 327 returns the update license as a response. Details of a processing of the update license acquiring request receiving unit 327 will be described hereinafter with reference to flowcharts of FIGS. 12A and 12B.

A use information registration screen displaying request receiving unit 328 is a unit which is executed by receiving a request to display a use information registration screen from the network I/F 226 of the license server 101. The use information registration screen displaying request is transmitted from the information processing apparatus 121 of the distributor firm. The use information registration screen displaying request receiving unit 328 transmits data for displaying a use information registration screen 501 (FIG. 5), which will be described hereinafter, to the information processing apparatus 121 to which the request was made.

Each unit of the software configuration 302 in FIG. 3B is executed by a method whereby, in the image forming apparatus 112 or 132, the CPU 207 loads the program stored in the hard disk 208 into the volatile memory 210.

A device information holding unit 341 is a unit for holding a device information table into the hard disk 208 of the image forming apparatus 112 or 132. At least device serial numbers to uniquely identify the image forming apparatuses 112 and 132 are held in the device information table.

A device license information holding unit 342 is a unit for holding a device license information table into the hard disk 208 of the image forming apparatus 112 or 132. An example of the device license information table stored in the device license information holding unit 342 is shown in Table F.

TABLE F

Device license information table

| APPLICATION ID | APPLICATION VERSION | APPLICATION NAME | USAGE STARTING DATE | USAGE ENDING DATE | STORAGE PATH |
| --- | --- | --- | --- | --- | --- |
| app001 | 3.0 | Anyplace Print | | 2015 Sep. 29 | /apps/anyplace_3.0.jar |
| app002 | 2.1 | Seiton FAX | | 2015 Sep. 29 | /apps/seiton_2.1.jar |
| app003 | 1.3 | Erande my print | | 2015 Sep. 29 | /apps/myprint_1.3.jar |

In the device license information table of Table F, an application ID column is a column for storing an application ID of the installed application file 601. An application version column is a column for storing an application version of the application file. An application name column is a column for storing an application name of the application file. A usage starting date column is a column for storing a date when usage of the application file can be started. A usage ending date column is a column for storing a date when usage of the application file is ended. A storage path column is a column for storing a path of the hard disk 208 of the image forming apparatus 112 or 132 in which the application file has been stored.

A record in the device license information table is called a device license information record. The device license information record is added on a unit basis by which the application file is installed by using the license.

A device license history information holding unit 343 is a unit for holding a device license history information table into the hard disk 208 of the image forming apparatus 112 or 132. An example of the device license information table stored in the device license history information holding unit 343 is shown in Table G.

TABLE G

Device license history information table

| LICENSE ID | APPLICATION ID |
| --- | --- |
| LF00001 | app001 |
| LF00007 | app002 |
| LF00009 | app003 |

In the device license history information table of Table G, a license ID column is a column for storing a license ID of the license used to install. An application ID column is a column for storing an application ID of the license. A record in the device license history information table is called a device license history information record. The device license history information record is added on a unit basis by which the application file is installed by using the license.

An install screen displaying request receiving unit 351 is a unit which is executed by receiving a request to display an install screen from the network I/F 205 provided for the image forming apparatus 112 or 132. The install screen displaying request is transmitted from the information processing apparatuses 111 and 131. The install screen displaying request receiving unit 351 transmits data for displaying an install screen 401 (FIG. 4), which will be described hereinafter, to the information processing apparatus 111 or 131 to which the request was made. The install screen displaying request receiving unit 351 is executed when it receives the install screen displaying request from the operation unit 212 of the image forming apparatus 112 or 132 and may transmit data for displaying the install screen 401 to the display unit 211 of the image forming apparatus 112 or 132.

An online install request receiving unit 352 is a unit which is executed by receiving a request to online-install from the network I/F 205 provided for the image forming apparatus 112 or 132. The online install request is transmitted when an online install button 405 (FIG. 4) on the install screen 401 is depressed. A license access number as a value of a license access number input field 402 (FIG. 4) input by the install screen 401 is included in the online install request. Details of a processing which is executed in the online install request receiving unit 352 will be described hereinafter by using S707 in a sequence diagram of FIG. 7.

An offline install request receiving unit 353 is a unit which is executed by receiving a request to offline-install from the network I/F 205 provided for the image forming apparatus 112 or 132. The offline install request is transmitted when an offline install button 406 (FIG. 4) on the install screen 401 is depressed in the information processing apparatus 111 or 131. The application file designated by an application file input field 403 (FIG. 4) and a license designated by a license input field 404 (FIG. 4) are included in the offline install request. Details of a processing which is executed in the offline install request receiving unit 353 will be described hereinafter by using S706 in the sequence diagram of FIG. 7.

An install request receiving unit 354 is a unit which is executed by receiving an install request which is transmitted during the processings of the online install request receiving unit 352 and the offline install request receiving unit 353. The install request receiving unit 354 executes an install processing by using the application file and the license included in the received install request. Details of a processing which is executed in the install request receiving unit 354 will be described hereinafter by using flowcharts of FIGS. 12A and 12B.

An application start controlling unit 355 is a unit which is executed when the date is changed or when the image forming apparatus 112 or 132 is started by turning on its power supply. Details of a processing which is executed in the application start controlling unit 355 will be described hereinafter by using flowcharts of FIGS. 10A to 10C.

An example of an image provided by the image forming apparatus 112 or 132 is illustrated in FIG. 4. The install screen 401 is an image to install the application file. The install screen 401 is returned as a response from the image forming apparatus 112 or 132 when an install screen displaying request is transmitted from a browser or the like of the information processing apparatus 111 or 131 to the install screen displaying request receiving unit 351 of the image forming apparatus 112 or 132. The install screen 401 is returned in such a format that it can be displayed to the display unit 221 of the information processing apparatus 111 or 131.

The install screen 401 is an image for providing two methods in order to install the application. One is an online install for acquiring the application file and the license from the license server 101 via the Internet 102 and installing by inputting the license access number. The other is an offline install for designating the application file and the license existing at hand and installing.

The license access number input field 402 is a text field to input the license access number. The application file input field 403 is a text field to input the path of the application file. The license input field 404 is a text field to input the path of the license. The online install button 405 is a button to transmit an online install request to the image forming apparatus 112 or 132. When the online install button 405 is depressed, it transmits the value of the license access number input field 402 and the online install request to the image forming apparatus 112 or 132 via the network I/F 226 of the information processing apparatus 111 or 131. The device serial number stored in the device information holding unit 341 is included in the online install request.

The offline install button 406 is a button to transmit an offline install request to the image forming apparatus 112 or 132. When the offline install button 406 is depressed, it transmits the offline install request to the image forming apparatus 112 or 132 via the network I/F 226 of the information processing apparatus 111 or 131. The application file designated in the application file input field 403 and the license designated in the license input field 404 are included in the offline install request.

An example of an image provided by the license server 101 is illustrated in FIG. 5. The use information registration screen 501 is a screen to register the use information. The use information registration screen 501 is returned as a response from the license server 101 when the use information registration screen displaying request is transmitted from the browser or the like of the information processing apparatus 121 to the use information registration screen displaying request receiving unit 328 of the license server 101. The use information registration screen 501 is returned in such a format that it can be displayed to the display unit 221 of the information processing apparatus 121.

A license access number input field 502 is a text field to input the license access number serving as a target to register the use information. A device serial number input field 503 is a text field to input the device serial number of the image forming apparatus serving as a target to register the use information. A usage starting date input field 504 is a text field to input the date when the image forming apparatus 112 or 132 serving as a target can use the application. A usage ending date input field 505 is a text field to input the date when the image forming apparatus 112 or 132 serving as a target cannot use the application. A register button 506 is a button to transmit the use information registration request.

When the register button 506 is depressed, the use information registration request is transmitted to the license server 101 via the network I/F 226 of the information processing apparatus 121. At this time, values in the license access number input field 502 to the usage ending date input field 505 are included in the use information registration request.

Figure 6A:
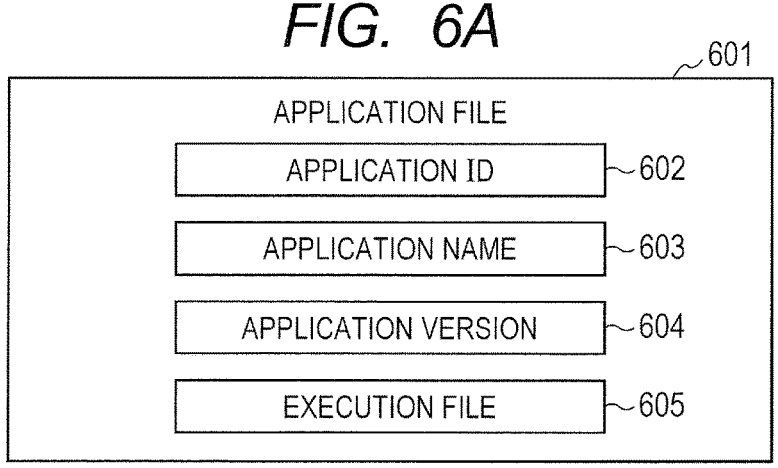
FIGS. 6A, 6B and 6C are diagrams illustrating a data structure of a file according to the embodiment of the invention.
Figure 6B:
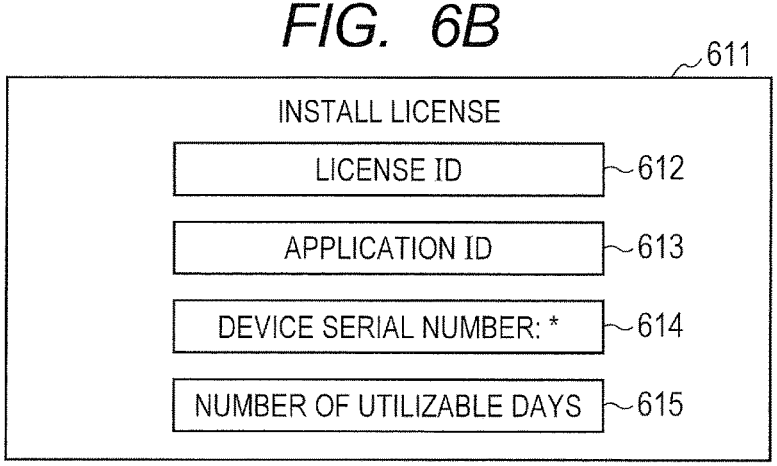
Figure 6C:
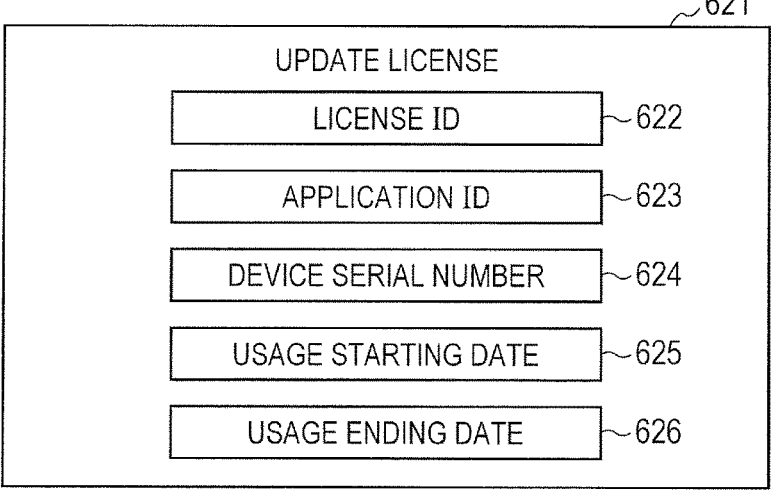

Data structures of files are illustrated in FIGS. 6A to 6C. FIG. 6A is a diagram illustrating the data structure of the application file 601. FIG. 6B is a diagram illustrating the data structure of an install license 611. FIG. 6C is a diagram illustrating the data structure of an update license 621.

The application file 601 illustrated in FIG. 6A is an extended program file to install in such a manner that an extended function can be used later in addition to the fundamental functions. The application file 601 holds at least information of 602 to 605. The application ID 602 is an identifier to uniquely identify a type of application file 601. The application name 603 and the application version 604 are a name and a version of the application file 601. An execution file 605 is a program which operates in the image forming apparatuses 112 and 132.

The install license 611 illustrated in FIG. 6B is issued together with the license access number by the license access number issuance request receiving unit 323. The install license 611 holds at least information of 612 to 615.

A license ID 612 is an identifier which can uniquely identify the install license 611. An application ID 613 is an identifier of the application file 601 which can be installed by the present license. A device serial number 614 is a serial number of the image forming apparatus 112 or 132 which can be installed by the present license. "*" showing that the application file can be installed to any image forming apparatus is held in the device serial number of the install license 611.

A number of utilizable days 615 is the number of days (using period) which can be used by the application file 601 by the present license. If a value of "5" is disclosed in the number of utilizable days 615, a usage of 5 days from the date of installation is permitted to the application file 601 installed by using the present license. In the embodiment, it is assumed that the number of utilizable days 615 of the install license 611 is issued as a fixed value of "5". However, the install license 611 may be issued by setting the number of utilizable days at the time of issuance of the license access number or at the time of registration of an item.

The update license 621 illustrated in FIG. 6C is issued when the use information is registered by the use information registration request receiving unit 324. The update license 621 holds at least information of 622 to 626. A license ID 622 is an identifier which can uniquely identify the license. An application ID 623 is an identifier of the application file 601 which can be installed by the present license. A device serial number 624 is a serial number of the image forming apparatus 112 or 132 which can be installed by the present license. A usage starting date 625 and a usage ending date 626 is a date when a usage of the application file 601 can be started by the present license and a date when a usage of the application file 601 can be ended by the present license.

Figure 7:
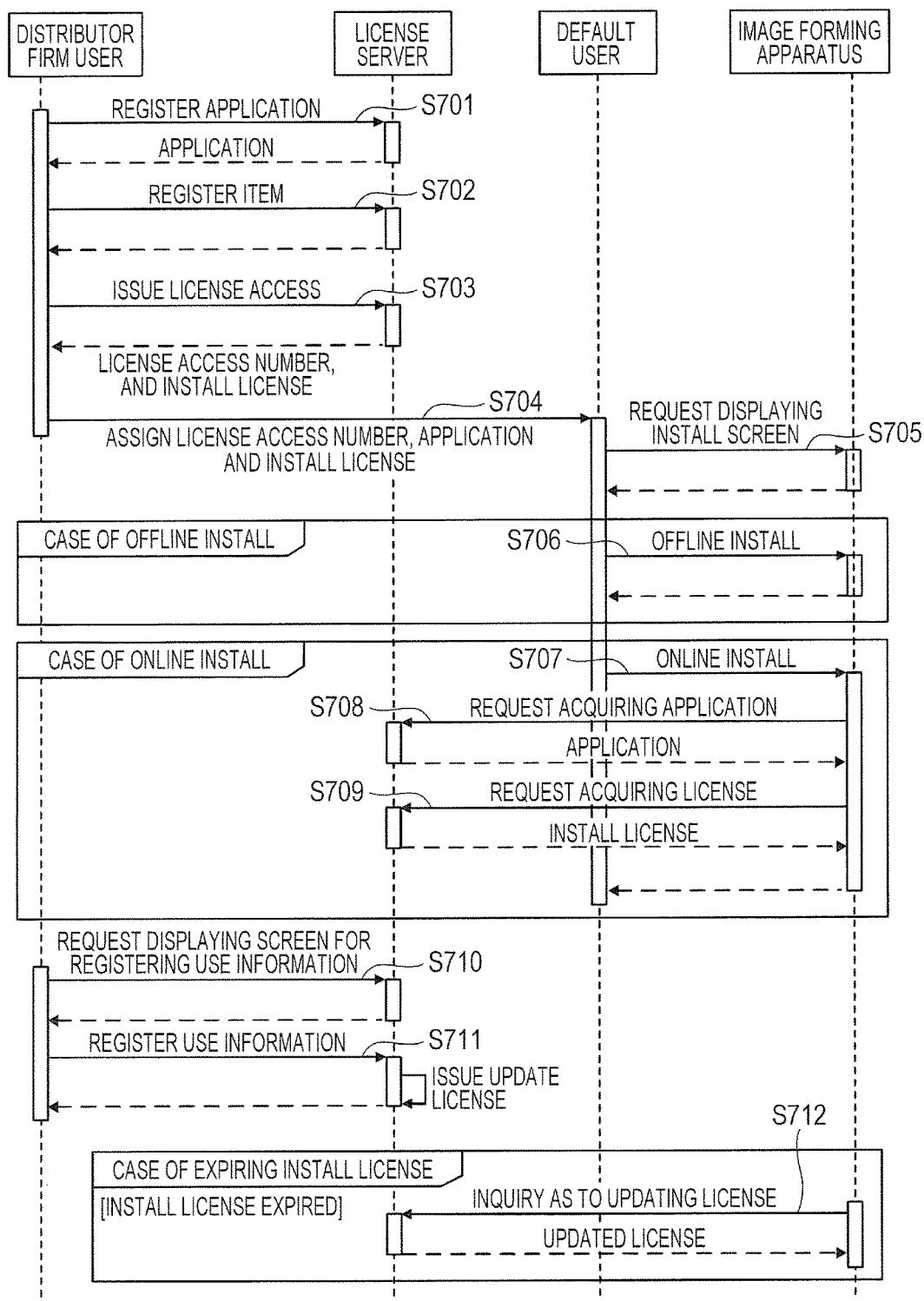
FIG. 7 is a sequence diagram illustrating a flow from a registration of application information to an obtainment of a license according to the embodiment of the invention.

FIG. 7 illustrates a sequence diagram for describing a flow from a registration of application information for selling a subscription item to an obtainment of the update license.

First, in S701, the distributor firm transmits the application information registration request to the license server 101 from the information processing apparatus 121 existing in the distributor firm network environment 120 and registers the application information. At least the application file 601 is included in the application information registration request. The application information registration request receiving unit 321 of the license server 101 stores the application file 601 included in the received application information registration request into the hard disk 224 of the license server 101. The application information registration request receiving unit 321 stores into the application information table of Table A as a new application information record having the information of the received application file 601 and the information of the path stored in the hard disk 224. The registered application file 601 can be downloaded from the license server 101 by using the application file acquiring request receiving unit 326.

In S702, the distributor firm transmits the item information registration request to the license server 101 from the information processing apparatus 121 existing in the distributor firm network environment 120 and registers the item information. At least the item ID, item name, and application ID are included in the item information registration request. The item information registration request receiving unit 322 of the license server 101 stores the data included in the received item information registration request as a new item information record into the item information table of Table B.

In S703, the distributor firm user transmits the license access number issuance request to the license server 101 from the information processing apparatus 121 existing in the distributor firm network environment 120. At least the item ID is included in the license access number issuance request. The license access number issuance request receiving unit 323 of the license server 101 issues the license access number and the install license 611 on the basis of the received license access number issuance request and provides an image to download them. The distributor firm user can acquire the license access number and the install license 611 displayed on the image via the information processing apparatus 121. Only one license access number and one install license 611 can be issued for one item. A reason why only one install license 611 is issued is that since the install license 611 is a license which can be installed to any image forming apparatus, there is no need to issue a plurality of install licenses. If a plurality of install licenses are issued, there is such a risk that by using a plurality of install licenses to one image forming apparatus, the term of validity of the license is extended. Therefore, it is necessary to avoid such a situation.

In S704, the distributor firm user assigns the application file 601 registered in S701 and the license access number and the install license 611 acquired in S703 to the default user who performs the initial setting. As an assigning method, they may be assigned by E-mail or may be assigned via an electronic medium such as USB memory, DVD medium, or the like. In S704, the data to be assigned may be only the license access number or only the application file and install license in dependence on an installing method, which will be described hereinafter.

In S705, the default user transmits the install screen displaying request to the image forming apparatus 132 by using the browser of the information processing apparatus 131 of the installed factory network environment 130. When the install screen displaying request is received, the install screen displaying request receiving unit 351 of the image forming apparatus 132 returns the data for displaying the install screen 401 to the information processing apparatus 131. The information processing apparatus 131 displays the data of the install screen 401 to the browser.

S706 is a processing to describe a case where the default user performs the installation by offline. The offline installation is performed in such a case that the image forming apparatus 112 or 132 cannot access the license server 101 via the Internet 102.

In S706, the default user designates the application file 601 and the install license 611 acquired in S704 to the application file input field 403 and the license input field 404 of the install screen 401, respectively. The default user depresses the offline install button 406 and transmits the offline install request including the designated application file 601 and install license 611 to the image forming apparatus 112 or 132. The offline install request receiving unit 353 of the image forming apparatus 112 or 132 acquires the application file 601 and the install license 611 included in the offline install request. The offline install request receiving unit 353 transmits the install request including the acquired application file 601 and install license 611 to the install request receiving unit 354 and installs the application file 601. A processing which is executed in the install request receiving unit 354 will be described hereinafter with reference to flowcharts of FIGS. 12A and 12B.

As for the install license 611 which is designated in S706, since the value included in the device serial number 614 is "*", the install operation can be performed to any image forming apparatus by using the same install license. Since the install license of the same license ID cannot be installed so as to overlap with the same image forming apparatus, there is no risk of extension of the term. Such a point will be also described hereinafter with reference to flowcharts of FIGS. 12A and 12B.

S707 to S709 are processings to describe a case where the default user performs an installation by online. The online installation is performed in such a case that the image forming apparatus 112 or 132 can access the license server 101 via the Internet 102.

In S707, the default user designates the license access number acquired in S704 to the license access number input field 402 of the install screen 401. When the default user depresses the online install button 405, the online install request is transmitted to the image forming apparatus 112 or 132. At least the designated license access number and the device serial number stored in the device information holding unit 341 are included in the online install request. The transmitted online install request is received by the online install request receiving unit 352 of the image forming apparatus 112 or 132. The online install request receiving unit 352 acquires the license access number and the device serial number from the received online install request and executes processings of next S708 and S709.

In S708, the online install request receiving unit 352 transmits the application file acquiring request including the license access number to the application file acquiring request receiving unit 326 of the license server 101. The online install request receiving unit 352 receives the application file 601 which is returned as a response from the application file acquiring request receiving unit 326.

In S709, the online install request receiving unit 352 transmits the license acquiring request including the acquired license access number and device serial number to the license acquiring request receiving unit 325 of the license server 101. The online install request receiving unit 352 receives the install license 611 which is returned as a response from the license acquiring request receiving unit 325.

After that, the online install request receiving unit 352 transmits the install request including the application file 601 and the install license 611 acquired in S708 and S709 to the install request receiving unit 354. In addition to it, the application file 601 is installed.

As for the install license 611 which can be acquired by the license access number designated in S707, since "*" is included in the device serial number 614, the install operation can be performed to any image forming apparatus by using the same license access number.

In S710, the distributor firm user transmits the use information registration screen displaying request to the license server 101 by using the browser of the information processing apparatus 121 of the distributor firm network environment 120. When the use information registration screen displaying request is received, the use information registration screen displaying request receiving unit 328 of the license server 101 returns data to display the use information registration screen 501 to the information processing apparatus 121. The information processing apparatus 121 displays the received data of the use information registration screen 501 to the browser.

In S711, the distributor firm user inputs the license access number, device serial number, usage starting date, and usage ending date to the displayed use information registration screen 501, depresses the register button 506, and transmits the use information registration request to the license server 101. The license access number, device serial number, usage starting date, and usage ending date which were input are included in the use information registration request. The transmitted use information registration request is received by the use information registration request receiving unit 324 of the license server 101. The license server 101 issues the update license 621 on the basis of the received use information. The issued update license 621 is held in the hard disk 224 of the license server 101 in association with the device serial number included in the use information.

As for the license access number which is input by the distributor firm user, only one number is issued per item. Therefore, it is unnecessary that the distributor firm issues the license access number each time the distributor firm makes a contract with the customer, and it is sufficient to manage only one license access number. The device serial number included in the use information registration request is stored in the device serial number 624 of the update license 621. Consequently, the application file can be installed only into the image forming apparatus of the device serial number included in the use information registration request and such a situation that it is used in another image forming apparatus can be prevented.

Although the use information registration request is transmitted from the information processing apparatus 121 existing in the distributor firm network environment 120 in the present sequence diagram, the use information registration request may be transmitted from the contract server 122 at timing when contract information is input to the contract server 122.

S712 is a processing of the application start controlling unit 355 which is executed when the date is changed or when the power supply of the image forming apparatus 112 or 132 is turned on. In S712, if the number of utilizable days of the install license 611 was expired, the image forming apparatus 112 or 132 transmits the update license acquiring request to the license server 101. The device serial number of the image forming apparatus 112 or 132 and the application ID of the install license 611 expired are included in the update license acquiring request.

The transmitted update license acquiring request is received by the update license acquiring request receiving unit 327 of the license server 101. The update license acquiring request receiving unit 327 returns the update license 621, as a response, issued in S711 and corresponding to the received device serial number and application ID.

The application start controlling unit 355 updates the device license information record by using the update license 621 returned as a response. By updating the device license information record, data of the device license information record set by the install license 611 is updated by the information stored in the update license 621. Since it is overwritten by the data of the update license 621, if the present date is the usage starting date 625 of the update license 621 or after and is before the usage ending date 626, the application file 601 can be used. Details of the application start controlling unit 355 will be described hereinafter with reference to flowcharts of FIGS. 10A to 10C.

Although the use information registering operation in S710 and S711 is executed after the installing operation of S705 to S709 in the sequence diagram of FIG. 7, the installing operation may be executed after the use information registering operation.

Figure 8:
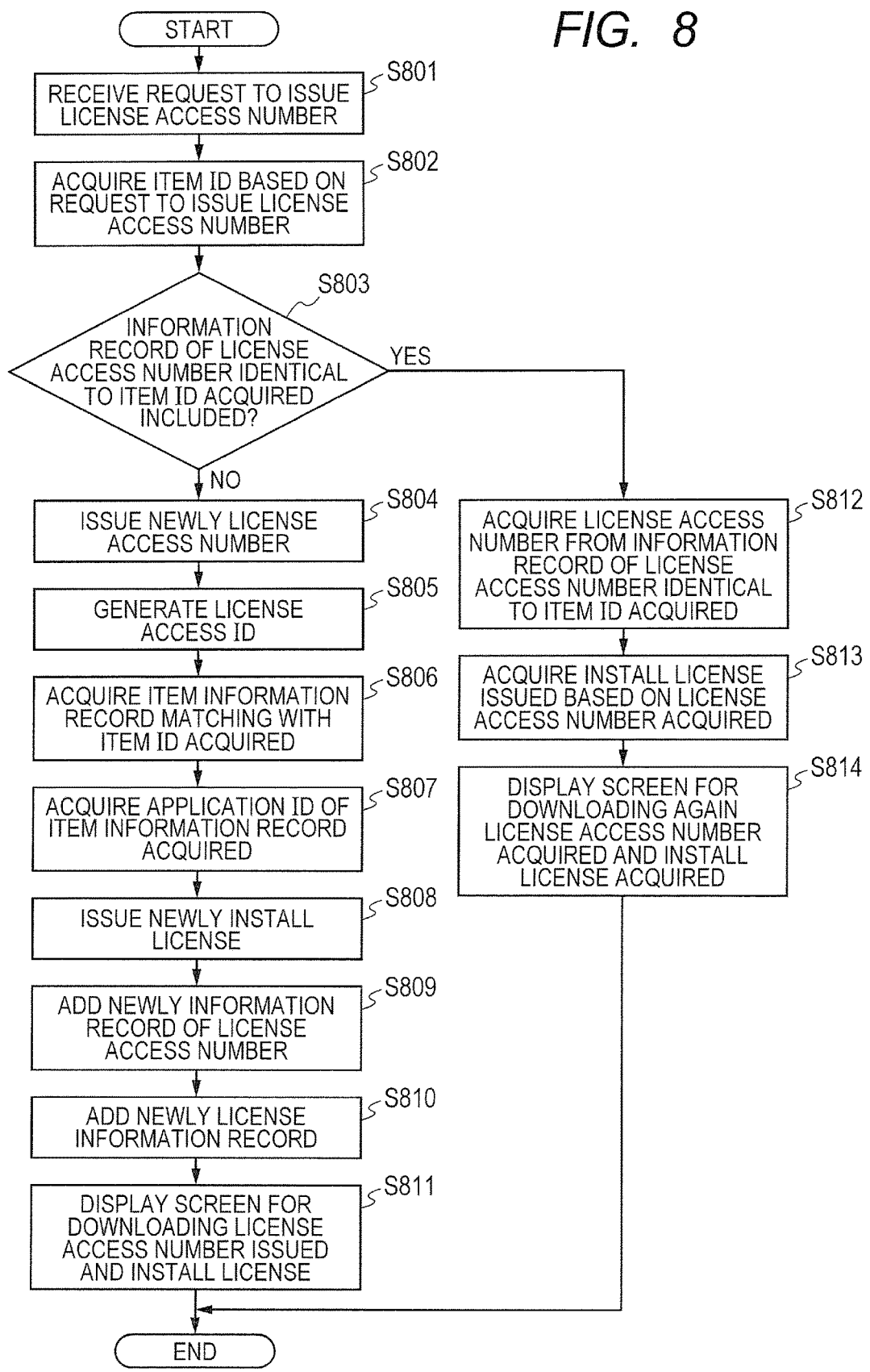
FIG. 8 is a flowchart for a processing to receive a request to issue a license access number according to the embodiment of the invention.

FIG. 8 is a flowchart for a processing which is executed when, in the license server 101, the license access number issuance request receiving unit 323 receives the license access number issuance request via the network I/F 226. The license access number issuance request is transmitted from the information processing apparatus 121 of the distributor firm network environment 120. The license access number issuance request receiving unit 323 issues the license access number and the install license to use the item of the item ID included in the received license access number issuance request. The license access number issuance request receiving unit 323 also discriminates whether or not the license access number of the item corresponding to the item ID included in the license access number issuance request has already been issued. In the case of the item ID in which the license access number is not issued yet, a license access number and the install license are newly issued and returned as a response. In the case of the item ID in which the license access number has already been issued, the issued license access number and install license are returned as a response.

First, in S801, the license access number issuance request receiving unit 323 receives the license access number issuance request. In S802, the unit 323 acquires the item ID from the license access number issuance request acquired in S801. In S803, the license access number issuance request receiving unit 323 discriminates whether or not the license access number information record having a value identical to the item ID acquired in S802 exists. If such a record exists, the license access number issuance request receiving unit 323 advances to S812. If it does not exist, the processing routine advances to S804.

If the license access number responsive to the license access number issuance request is not issued yet, the license access number issuance request receiving unit 323 newly issues a unique license access number in S804 and generates a unique license ID in S805. In S806, the license access number issuance request receiving unit 323 acquires the item information record matching with the item ID acquired in S802. Subsequently, in S807, the license access number issuance request receiving unit 323 acquires the application ID from the application ID column of the item information record acquired in S806.

In S808, the license access number issuance request receiving unit 323 newly issues the install license 611. The license ID generated in S805 and the application ID acquired in S807 are set into the license ID 612 and the application ID 613 of the install license 611 issued, respectively. "*" is set into the device serial number 614 of the install license 611 issued and "5" is set into the number of utilizable days 615, respectively. The issued install license 611 is stored into the hard disk 224 of the license server 101. Although "5" is fixedly set into the number of utilizable days 615 in the embodiment, a term of the initial setting operation may be variably set by inputting the item information or by inputting at the timing for issuing the license access number.

In S809, the license access number issuance request receiving unit 323 newly generates a license access number information record and adds into the license access number information table. The license access number issued in S804 and the item ID acquired in S802 are stored into the license access number column and the item ID column of the license access number information record newly generated, respectively.

In S810, the license access number issuance request receiving unit 323 newly generates a license information record and adds into the license information table. The license access number issued in S804 and the item ID generated in S805 are stored into the license access number column and the license ID column of the license information record newly generated, respectively. "*" is stored in the device serial number column of the license information record and a path in which the install license has been stored in S808 is stored in the storage path column.

In S811, the license access number issuance request receiving unit 323 returns a screen, as a response, for downloading the license access number issued in S804 and the install license issued in S808 to the information processing apparatus 121.

If the license access number responsive to the license access number issuance request has already been issued, in S812, the license access number issuance request receiving unit 323 acquires the license access number information record having a value identical to the item ID acquired in S802. The unit 323 acquires the license access number of the acquired license access number information record.

In S813, the license access number issuance request receiving unit 323 acquires the license information record in which a value of the license access number column is identical to the license access number acquired in S812 and a value of the device serial number column is "*". Further, the license access number issuance request receiving unit 323 acquires the install license stored in the hard disk 224 of the license server 101 from the value of the storage path of the acquired license information record.

In S814, the license access number issuance request receiving unit 323 returns a screen, as a response, for downloading again the license access number acquired in S812 and the install license acquired in S813 to the information processing apparatus 121.

If there is the issuance request of the license access number, by the foregoing processings of the flowchart of FIG. 8, the license server 101 can return only one license access number and one install license to one item. By executing the processings in this manner, such a situation that a plurality of install licenses are issued for one item can be prevented. Therefore, such a situation that the using period is extended by using a plurality of install licenses can be prevented.

Figure 9:
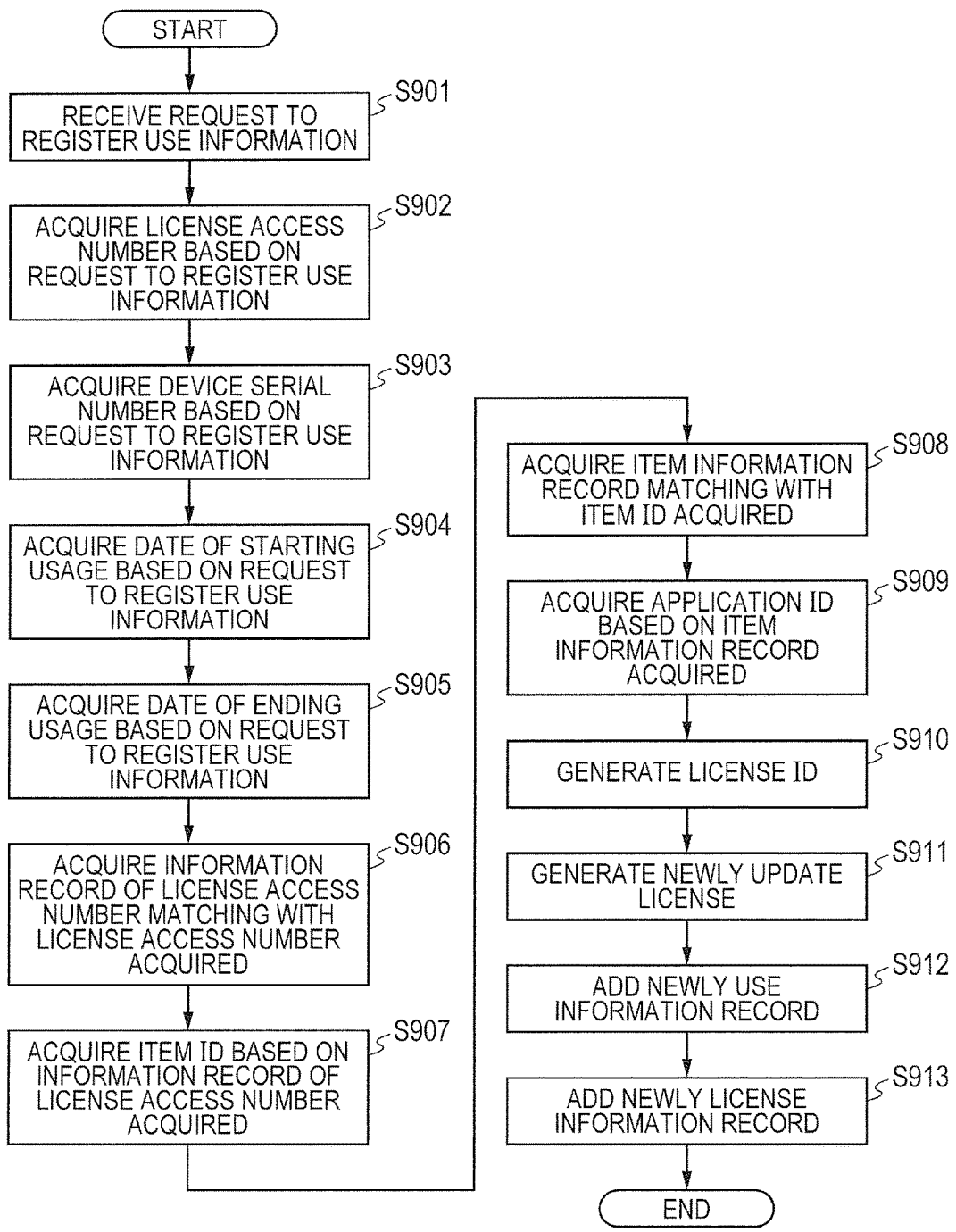
FIG. 9 is a flowchart for a processing to receive a request to register use information according to the embodiment of the invention.

FIG. 9 is a flowchart for a processing which is executed when, in the license server 101, the use information registration request receiving unit 324 receives the use information registration request via the network I/F 226. The use information registration request is transmitted from the information processing apparatus 121 of the distributor firm. The use information registration request receiving unit 324 generates the update license 621 on the basis of the information included in the use information registration request and holds into the hard disk 224 of the license server 101 in association with the device serial number included in the use information registration request.

The use information registration request receiving unit 324 receives the use information registration request in S901. In subsequent S902 to S905, the unit 324 acquires the following information from the use information registration request acquired in S901. That is, the use information registration request receiving unit 324 acquires the license access number in S902, the device serial number in S903, the usage starting date in S904, and the usage ending date in S905, respectively.

In S906, the use information registration request receiving unit 324 acquires the license access number information record matching with the license access number acquired in S902. In S907, the unit 324 acquires the item ID from the license access number information record acquired in S906. In S908, the use information registration request receiving unit 324 acquires the item information record matching with the item ID acquired in S907. In S909, the unit 324 acquires the application ID from the item information record acquired in S908. In S910, the use information registration request receiving unit 324 generates the unique license ID.

In S911, the use information registration request receiving unit 324 generates the update license 621. The license ID generated in S910, the application ID acquired in S909, and the device serial number acquired in S903 are set into the license ID 622, application ID 623, and device serial number 624 of the update license 621 which is generated, respectively. The usage starting date acquired in S904 and the usage ending date acquired in S905 are set into the usage starting date 625 and usage ending date 626 of the update license 621 which is generated, respectively. The generated update license 621 is stored into the hard disk 224 of the license server 101.

In S912, the use information registration request receiving unit 324 newly adds the use information record into the use information table. The license access number, device serial number, usage starting date, and usage ending date acquired in S902 to S905 are set into the license access number column, device serial number column, usage starting date column, and usage ending date column of the use information record, respectively.

In S913, the use information registration request receiving unit 324 newly adds the generated update license 621 as a license information record into the license information table. The license access number acquired in S902 and the device serial number acquired in S903 are set into the license access number column and the device serial number column of the license information record which is added, respectively. The license ID generated in S910 and the path on the hard disk 224 of the license server 101 in which the update license 621 has been stored in S911 are set into the license ID column and the storage path column of the license information record, respectively.

When the use information is registered, by the processings of the flowchart of FIG. 9 mentioned above, the application file can be installed in response to only the device serial number designated to the use information, and the update license 621 which operates only for the term designated to the use information is generated. The generated update license 621 is held into the hard disk 224 of the license server 101 in association with the device serial number.

Figure 10A:
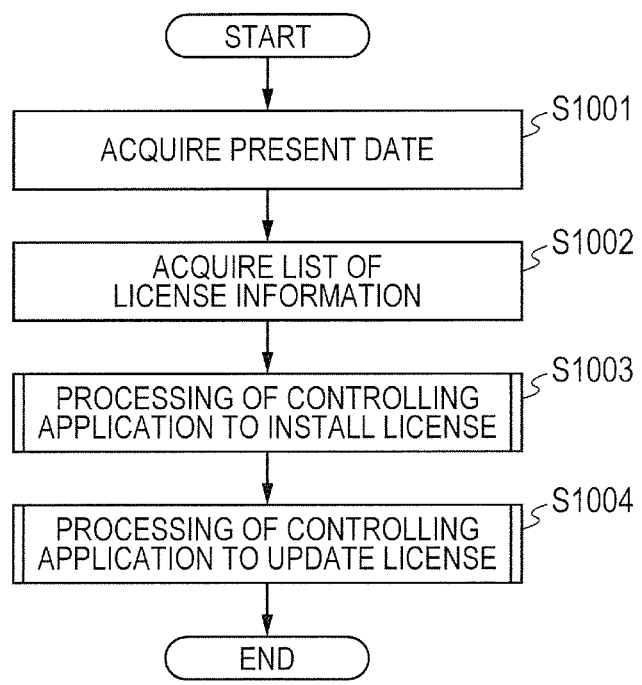
FIG. 10A is a flowchart for a processing to control start of an application according to the embodiment of the invention.

FIG. 10A is a flowchart for a processing of the application start controlling unit 355 which is executed when the date is changed or the power supply is turned on in the image forming apparatus 112 or 132. The application file in the term of validity of the license is started or the update license 621 when the term of the install license is expired is acquired on the basis of the date when the device is set.

In S1001, the application start controlling unit 355 acquires the present date set in the device. In S1002, the unit 355 acquires a device license information record list stored in the device license information table of Table F. In S1003, the application start controlling unit 355 controls the start of the application file which is operating by the install license. The processing which is executed in S1003 will be described hereinafter with reference to a flowchart of FIG. 10B. In S1004, the application start controlling unit 355 controls the start of the application file 601 which is operating by the update license 621. The processing which is executed in S1004 will be described hereinafter with reference to a flowchart of FIG. 10C.

Figure 10B:
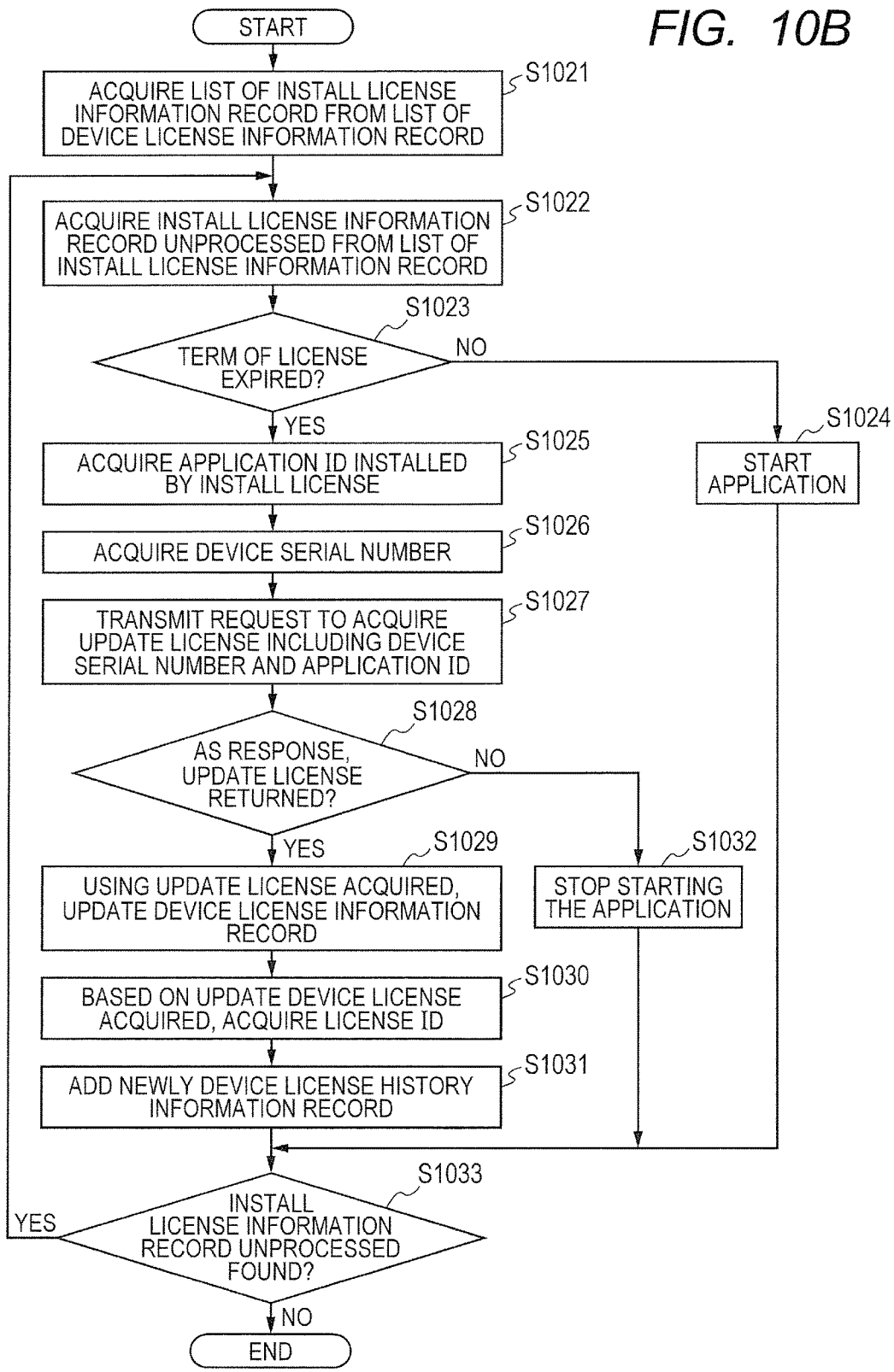
FIG. 10B is a flowchart for a processing which is executed in S1003 in FIG. 10A.

FIG. 10B is a flowchart for the processing which is called in S1003 in FIG. 10A. First, in S1021, the application start controlling unit 355 acquires a list of device license information records installed by the install license as an install license information record list. Specifically speaking, the device license information records in which there is no value in the usage starting date are acquired as a list from the device license information record list acquired in S1002.

In S1022, the application start controlling unit 355 acquires the unprocessed install license information records in the install license information record list acquired in S1021. In S1023, the application start controlling unit 355 discriminates whether or not a value of the usage ending date of the install license information record acquired in S1022 has expired the date acquired in S1001. As a result of the discrimination, if the usage ending date is expired, the processing routine advances to S1025. If NO, S1024 follows.

If the term of license is expired in S1023, in S1025, the application start controlling unit 355 acquires a value, as an application ID, of the application ID column of the install license information record acquired in S1022. In S1026, the application start controlling unit 355 acquires the device serial number stored in the device information holding unit 341.

In S1027, the application start controlling unit 355 transmits the update license acquiring request in which the application ID acquired in S1025 and the device serial number acquired in S1026 are held to the update license acquiring request receiving unit 327 of the license server 101. In S1028, the application start controlling unit 355 discriminates whether or not the update license 621 has been returned as a response to the transmitted update license acquiring request. If the update license 621 has been returned, S1029 follows. If NO, S1032 follows.

In S1029, the application start controlling unit 355 updates the install license information record acquired in S1022 by using the update license 621 acquired in S1028. Specifically speaking, the values of the usage starting date column and the usage ending date column of the install license information record are overwritten by the values of the usage starting date 625 and the usage ending date 626 of the update license 621.

In S1030, the application start controlling unit 355 acquires the license ID 622 of the update license 621 acquired in S1028. In S1031, the unit 355 newly adds a device license history information record into the device license history information table. The license ID acquired in S1030 and the application ID acquired in S1025 are set into the license ID column and the application ID column of the device license history information record which is added, respectively.

In S1033, the application start controlling unit 355 discriminates whether or not the unprocessed record in the install license information record list acquired in S1021 exists. If such a record exists, the processing routine is returned to S1022. If NO, S1004 follows.

If the license is valid in S1023, in S1024, the application start controlling unit 355 starts the application file stored in the storage path column of the install license information record acquired in S1022, and advances to S1033.

If the update license 621 is not returned in S1028, control is made as follows. That is, in S1032, the application start controlling unit 355 stops the start of the application file 601 stored in the storage path column of the install license information record acquired in S1022, and advances to S1033.

Figure 10C:
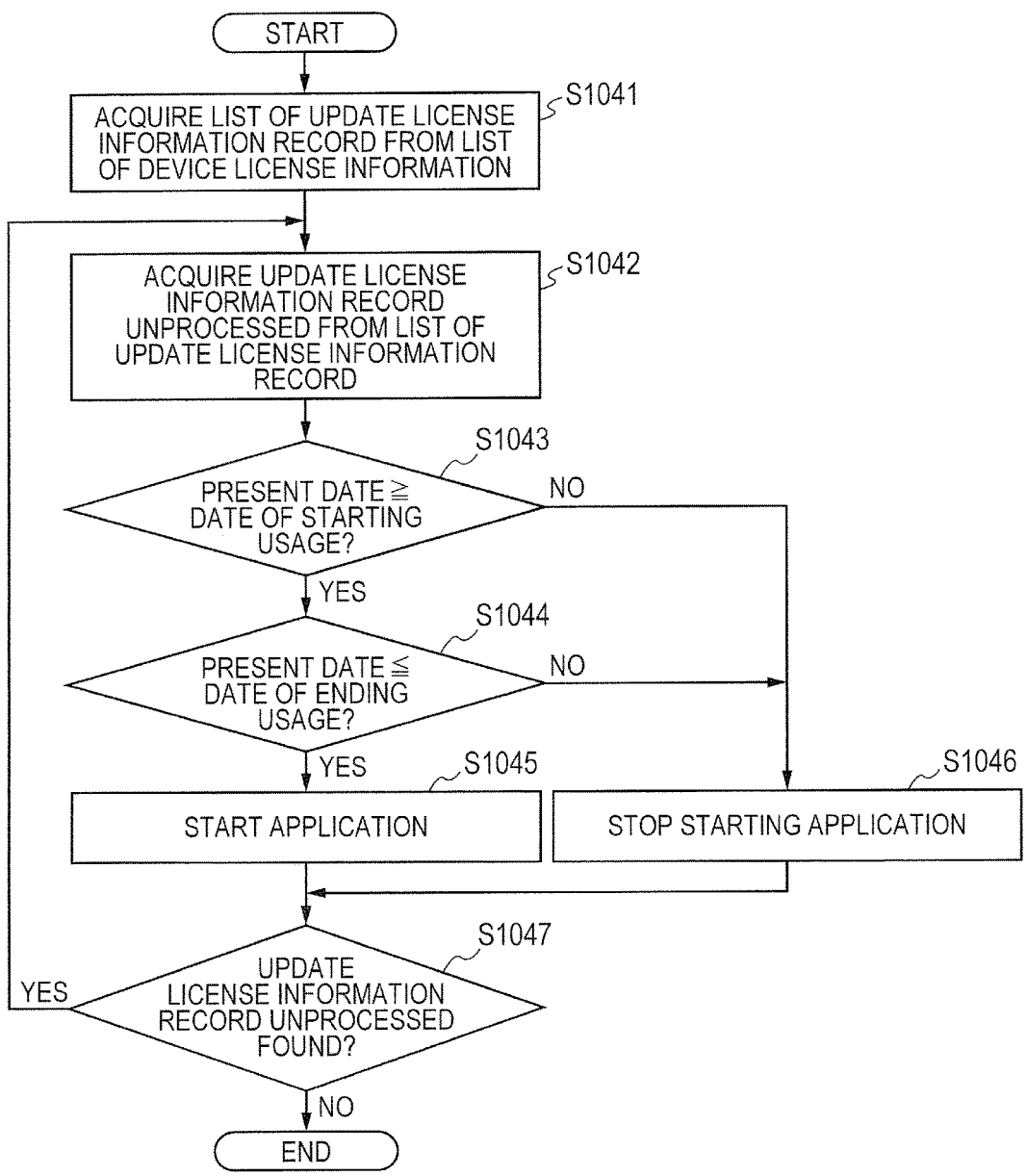
FIG. 10C is a flowchart for a processing which is executed in S1004 in FIG. 10A.

FIG. 10C is a flowchart for the processing which is called in S1004 in FIG. 10A. First, in S1041, the application start controlling unit 355 acquires a list of device license information records installed by the update license 621 as an update license information record list. Specifically speaking, the application start controlling unit 355 acquires a list of device license information records from the device license information table. The device license information records in which the value has been stored in the usage starting date column in the acquired device license information record list are acquired as a list of the update license information records.

In S1042, the application start controlling unit 355 acquires the unprocessed update license information records in the update license information record list acquired in S1041. In S1043, the application start controlling unit 355 discriminates whether or not the usage starting date of the update license information record acquired in S1042 has expired the date acquired in S1001. If the usage starting date is expired, the processing routine advances to S1044. If NO, S1046 follows.

In S1044, the application start controlling unit 355 discriminates whether or not the usage ending date of the update license information record acquired in S1042 has expired the date acquired in S1001. If the usage ending date is not expired, the processing routine advances to S1045. If it is expired, S1046 follows.

In S1045, the application start controlling unit 355 starts the application file stored in the storage path column of the update license information record acquired in S1042. In S1047, the application start controlling unit 355 discriminates whether or not there are the unprocessed records in the update license information record list acquired in S1041. If there are the unprocessed records, the processing routine is returned to S1042. If there are no unprocessed records, the processing routine is ended.

In S1046, the application start controlling unit 355 stops the start of the application file stored in the storage path column of the update license information record acquired in S1042.

By the processings of the flowcharts of FIGS. 10A to 10C mentioned above, the application file 601 stored in the image forming apparatus 112 or 132 operates only for the term when the license is valid. When the application file 601 is operating by the install license 611, the update license 621 can be automatically acquired when the term of validity is expired.

Figure 11:
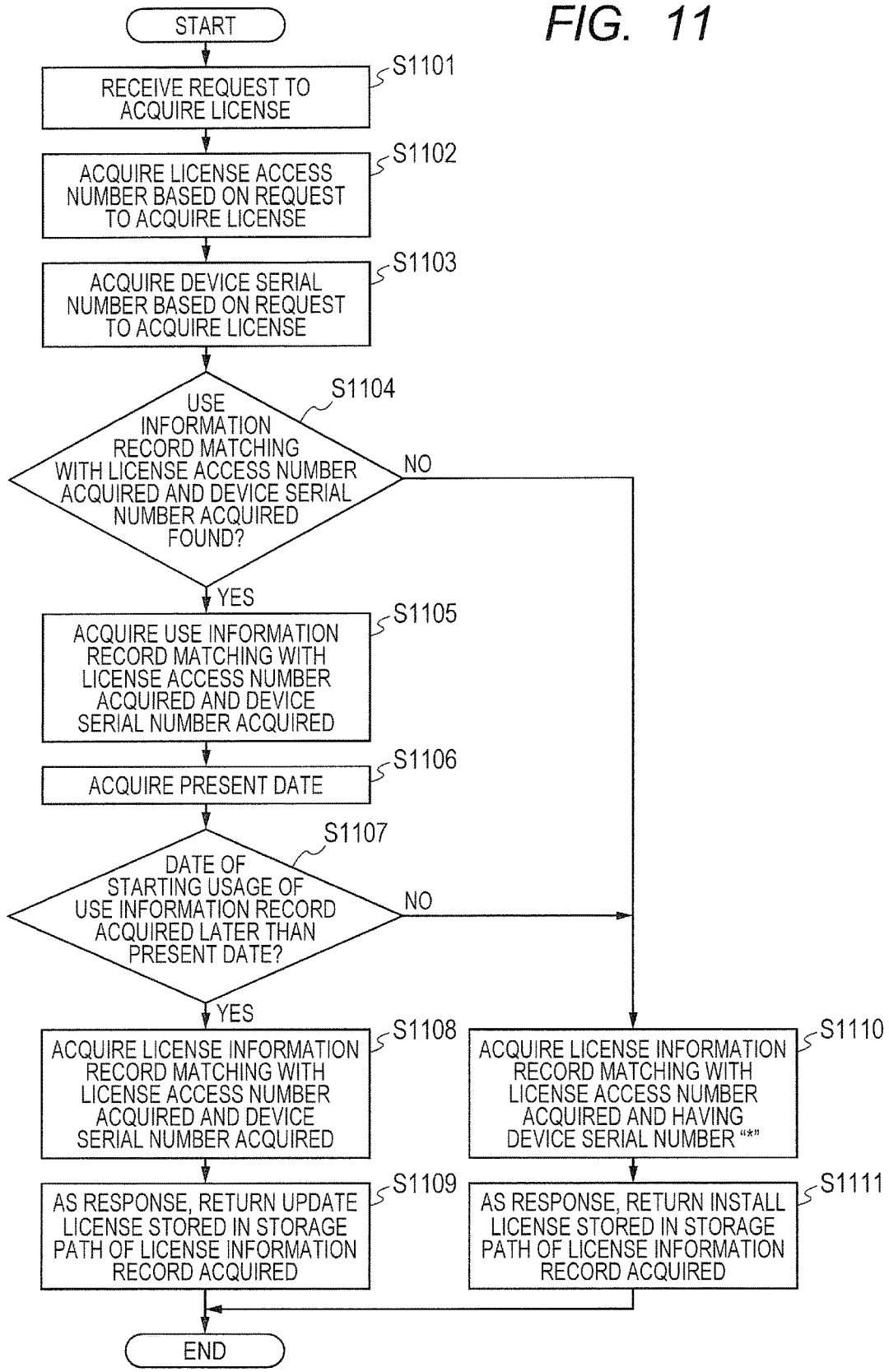
FIG. 11 is a flowchart for a processing to receive a request to acquire a license according to the embodiment of the invention.

FIG. 11 is a flowchart for a processing which is executed when, in the license server 101, the license acquiring request receiving unit 325 receives the license acquiring request via the network I/F 226. The license acquiring request is transmitted from the image forming apparatus 112 or 132. The license acquiring request receiving unit 325 returns the install license 611 or update license 621, as a response, to the image forming apparatus 112 or 132 on the basis of the license access number and the device serial number included in the license acquiring request.

In S1101, the license acquiring request receiving unit 325 receives the license acquiring request in S1101, acquires the license access number in S1102, and acquires the device serial number in S1103. In S1104, the license acquiring request receiving unit 325 discriminates whether or not the use information record matching with the license access number acquired in S1102 and the device serial number acquired in S1103 exist in the use information table. As a result of the discrimination, if the relevant use information record exists, the processing routine advances to S1105. If NO, in order to return the install license as a response, the processing routine advances to S1110.

In S1105, the license acquiring request receiving unit 325 acquires the use information record found in S1104. In S1106, the unit 325 acquires the present date of the license server 101. In S1107, the license acquiring request receiving unit 325 discriminates whether or not the value of the usage starting date column of the use information record acquired in S1105 has expired the date acquired in S1106. As a result of the discrimination, if the usage starting date has expired the present date, in order to return the update license 621 as a response, the processing routine advances to S1110. If the usage starting date does not expire the present date, in order to return the install license 611 as a response, the processing routine advances to S1110.

In S1108, the license acquiring request receiving unit 325 acquires the license information record matching with the license access number acquired in S1102 and the device serial number acquired in S1103. In S1109, the license acquiring request receiving unit 325 returns the update license 621, as a response, stored in the storage path column of the license information record acquired in S1110 to the image forming apparatus 112 or 132.

In S1110, the license acquiring request receiving unit 325 acquires the license information record in which the license access number acquired in S1102 and the device serial number acquired in S1103 are "*". In S1111, the license acquiring request receiving unit 325 returns the install license 611, as a response, stored in the storage path column of the license information record acquired in S1110 to the image forming apparatus 112 or 132.

When the license acquiring request is received, by the processings of the flowchart of FIG. 11 mentioned above, the license server 101 can return a proper response to the image forming apparatus 112 or 132 serving as an inquiring source side of the use information. That is, if the use information has been registered and the usage starting date is expired, the update license 621 is returned as a response. In the other cases, the install license 611 can be returned. By executing such processings, when the initial setting operation is executed, if the contract with the customer has already begun, the update license 621 can be installed from the beginning instead of the install license 611, so that a wasteful communication burden can be eliminated.

Figure 12A:
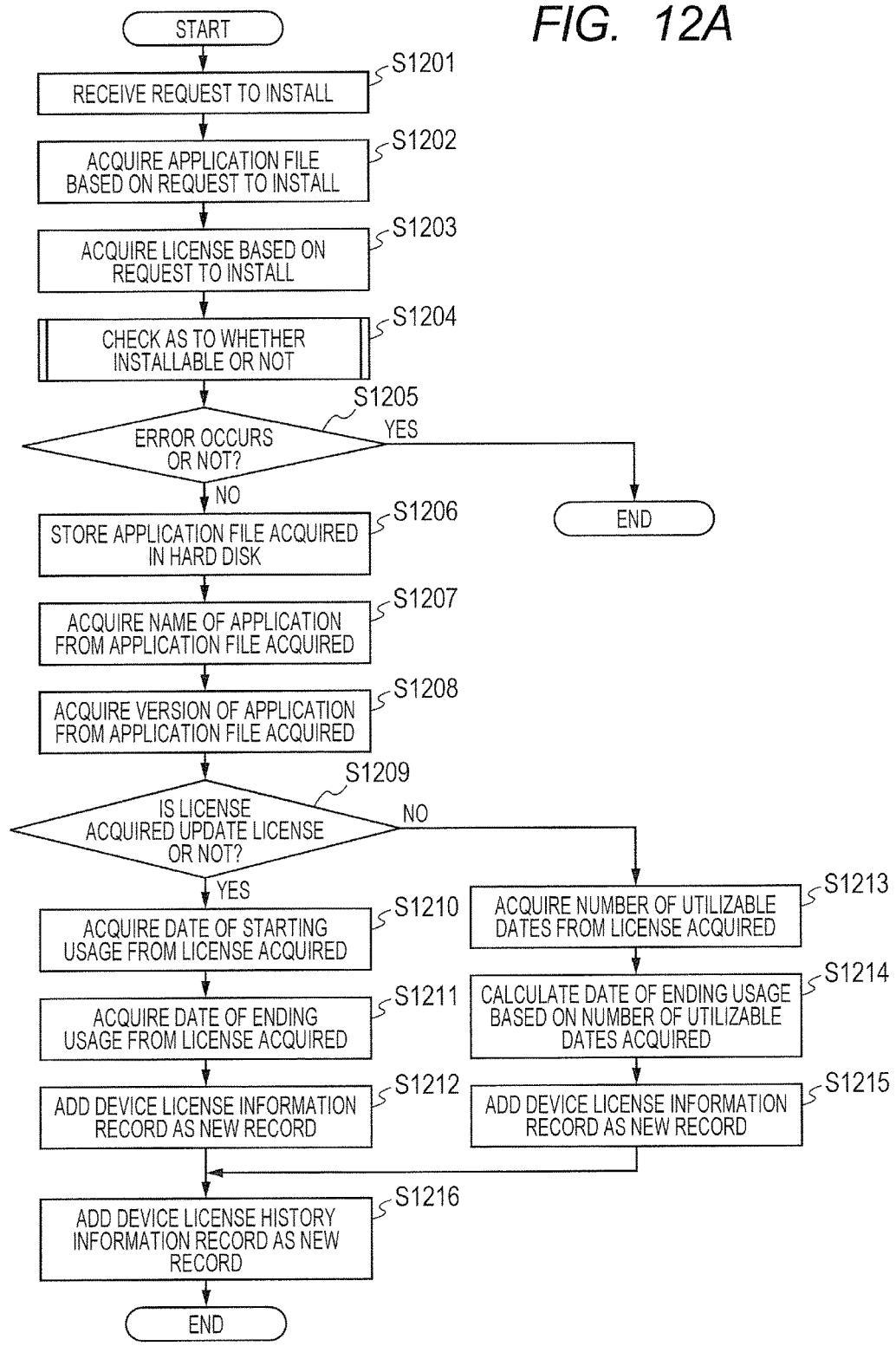
FIG. 12A is a flowchart for a processing to receive a request to install according to the embodiment of the invention.

FIG. 12A is a flowchart which is executed by the install request receiving unit 354 in the image forming apparatus 112 or 132. The install request receiving unit 354 is executed by receiving the install request from the online install request receiving unit 352 or the offline install request receiving unit 353. The application file 601 and the license are included in the install request which is received by the install request receiving unit 354. The install request receiving unit 354 executes the installing operation by using the received application file 601 and license.

The install request receiving unit 354 receives the install request in S1201, acquires the application file 601 from the received install request in S1202, and acquires the license in S1203. In S1204, the install request receiving unit 354 checks as to whether or not the application file is installable (details will be described with reference to FIG. 12B).

The check processing about the installability in S1204 in FIG. 12A will be described with reference to FIG. 12B. In S1231, the install request receiving unit 354 acquires the device serial number 614 or 624 from the license acquired in S1203. Subsequently, in S1232, the unit 354 discriminates whether not the device serial number is "*". As a result of the discrimination, if the device serial number is "*", the processing routine advances to S1234. If it is not "*", S1233 follows.

In S1233, the install request receiving unit 354 discriminates whether not the device serial number acquired in S1232 is matched with the device serial number held in the device information holding unit 341. If they are matched, S1234 follows. If they are not matched, S1239 follows. When they are not matched here, it is determined that the license is a license for another image forming apparatus.

In S1234, the install request receiving unit 354 acquires the application ID 602 of the application file 601 acquired in S1202. In S1235, the unit 354 acquires the application ID 613 or 623 of the license acquired in S1203. In S1236, the install request receiving unit 354 discriminates whether or not the application ID 602 acquired in S1234 and the application ID 613 or 623 acquired in S1235 are matched with each other. If they are matched, S1237 follows. If they are not matched here, S1239 follows. When they are not matched here, it is determined that the license is a license for another application file.

In S1237, the install request receiving unit 354 acquires the license ID 612 or 622 of the license acquired in S1203. In S1238, the install request receiving unit 354 discriminates whether or not the license ID 612 or 622 acquired in S1237 is included in the device license history information table of Table G. As a result of the discrimination, if the license ID 612 or 622 is included in such a table, S1239 follows. If the license ID 612 or 622 is not included, S1205 in FIG. 12A follows. When it is included here, it is determined that the license is a license which has already been used.

In S1239, the install request receiving unit 354 returns an error indicating unavailability of the license, and advances to S1205 in FIG. 12A.

A description is now returned to the processings of FIG. 12A. The install request receiving unit 354 discriminates whether or not the error has occurred in the check about installability in S1204. If the error has occurred, the processing routine is ended. If the error does not occur, the processing routine advances to S1206.

In S1206, the install request receiving unit 354 stores the application file acquired in S1202 into the hard disk 208 of the image forming apparatus 112 or 132. Subsequently, the install request receiving unit 354 acquires the application name 603 in S1207 and acquires the application version 604 in S1208 from the application file 601 acquired in S1202, respectively.

In S1209, the install request receiving unit 354 discriminates whether or not the license acquired in S1203 is the update license 621. Such a discrimination is made by checking whether or not the usage starting date 625 exists in the license, or the like. As a result of the discrimination, if the license is the update license 621, S1210 follows. If NO, S1213 follows.

In the case of the update license 621, the install request receiving unit 354 acquires the usage starting date 625 in S1210 and acquires the usage ending date 626 in S1211 from the update license 621 acquired in S1203, respectively. Subsequently, the install request receiving unit 354 newly adds a device license information record in S1212. The application ID 602 acquired in S1234 is stored in the application ID column of the device license information record which is added. Similarly, the application version 604 acquired in S1208 is stored in the application version column. The application name 603 acquired in S1207 is stored in the application name column. The usage starting date 625 acquired in S1210 is stored in the usage starting date column of the device license information record. Similarly, the usage ending date 626 acquired in S1211 is stored in the usage ending date column. The path of the application file 601 stored in S1206 is stored in the storage path column. After that, the processing routine advances to S1216.

If the license is not the update license 621, in S1213, the install request receiving unit 354 acquires the number of utilizable days 615 of the install license 611 acquired in S1203. In S1214, the unit 354 calculates the usage ending date from the number of utilizable days and the present date.

In S1215, the install request receiving unit 354 newly adds a device license information record. The application ID 602 acquired in S1234 is stored in the application ID column of the device license information record which is added. Similarly, the application version 604 acquired in S1208 is stored in the application version column. The application name 603 acquired in S1207 is stored in the application name column. The usage ending date calculated in S1214 is stored in the usage ending date column of the device license information record. The path of the application file 601 stored in S1206 is stored in the storage path column. Nothing is set into the usage starting date of the device license information record.

In S1216, the install request receiving unit 354 newly adds a device license history information record. The license ID 612 or 622 acquired in S1237 is stored in the license ID column of the device license history information record which is added, and the application ID 602 acquired in S1234 is stored in the application ID column, respectively.

Figure 12B:
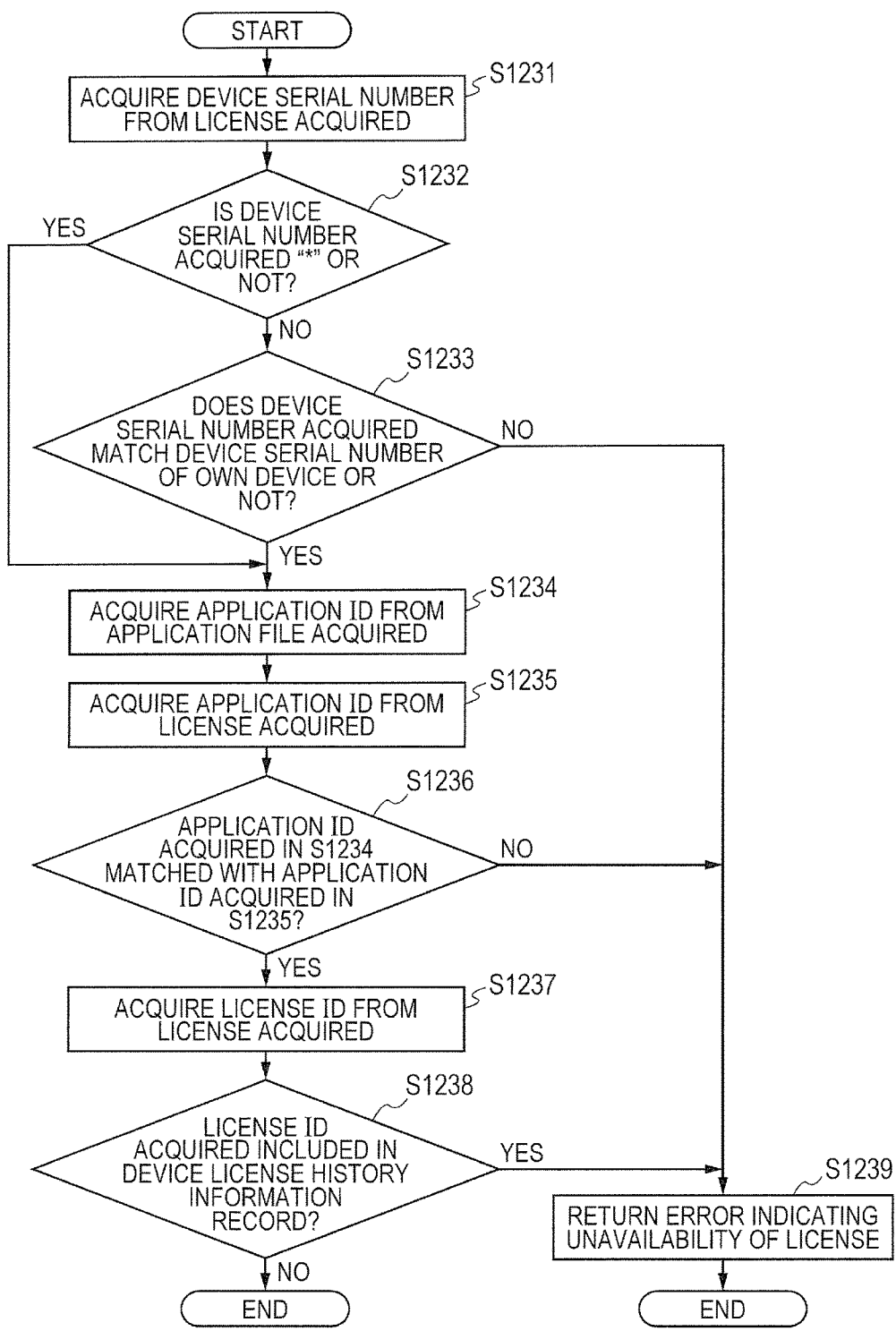
FIG. 12B is a flowchart illustrating details of S1204 in FIG. 12A.

By the processings of the flowcharts of FIGS. 12A and 12B mentioned above, the install processing of the application file 601 using the license can be executed. In the case of the install license 611 in which the device serial number stored in the license is "*", since the application file can be installed into any image forming apparatus, the initial setting operation can be executed to any image forming apparatus by using one license. Since the license ID 612 used once has been stored in the image forming apparatus, such a situation that the term is extended many times by using one license can be prevented. In the case of the update license 621, since the application file is installed only into the image forming apparatus having the number disclosed in the device serial number 624 of the license, such a situation that the application file is installed into another image forming apparatus with which a contract is not made can be prevented.

By the embodiment described above, the license server 101 can provide the install license 611 which operates for a few days for the purpose of initial setting and the update license 621 which operates for a contract term. When the application is installed by using the install license 611, since the image forming apparatus 112 or 132 can operate only for the number of utilizable days after the installation, the initial setting operation can be executed before the contract term. When the term of the number of utilizable days of the install license 611 is expired, the image forming apparatus 112 or 132 can be automatically updated to the update license 621 via the license server 101.

Other Embodiments

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-001603, filed Jan. 7, 2016, which is hereby incorporated by reference herein in its entirety.

What is claimed is:

1. A license management system having a license server and an image forming apparatus, wherein:
 the license server includes:
 a holding unit configured to hold an application file; and
 a license issuing unit configured to issue first and second licenses;
 wherein the second license has information indicating a contract duration of the application file including a usage starting date contracted with the customer and the first license has information indicating a usage period which makes the application file available for the purpose of an initial setting operation of the application file before the contract duration, wherein the initial setting operation comprises installation of the application file;

a transmitting unit configured to transmit the application file held in the holding unit and the first or second license issued by the license issuing unit to the image forming apparatus; and a checking unit configured to discriminate, in response to receiving a license acquiring request, whether or not the usage starting date contracted with the customer is after a present date acquired by the license server, wherein the transmitting unit transmits the first license to an installed factory network environment, if it is discriminated that the usage starting date contracted with the customer is after the present date acquired by the license server, and the transmitting unit transmits the second license to a customer network environment, if it is discriminated that the usage starting date contracted with the customer is not after the present date acquired by the license server;

wherein the image forming apparatus includes:

a discriminating unit configured to discriminate, based on the usage period of the first license, as to whether a usage period set in the image forming apparatus expires on the present date; and a controlling unit configured to control in such a manner that when a license received from the license server is the first license, if the discriminating unit discriminates that the usage period does not expire on the present date, the application file is made available for the initial setting operation, and if the discriminating unit discriminates that the usage period expires on the present date, a request of acquiring the second license is transmitted to the license server, to acquire the second license from the license server; and wherein when the license received from the license server is the second license, the controlling unit makes the application file available for the contract duration.

2. The system according to claim 1, wherein the first license can be installed into a plurality of image forming apparatuses.

3. The system according to claim 1, wherein the second license can be installed into only the image forming apparatus having a specific identifier.

4. A controlling method in a license management system having a license server and an image forming apparatus, the controlling method comprising:

in the license server:
holding an application file in a holding unit and issuing first and second licenses by a license issuing unit;

wherein the second license has information indicating a contract duration of the application file including a usage starting date contracted with the customer and the first license has information indicating a usage period which makes the application file available for the purpose of an initial setting operation of the application file before the contract duration, wherein the initial setting operation comprises installation of the application file;

transmitting the application file held in the holding unit to the image forming apparatus;

discriminating, in response to receiving a license acquiring request, that the usage starting date contracted with the customer is after a first present date acquired by the license server;

transmitting the first license to an installed factory network environment, when it is discriminated that the usage starting date contracted with the customer is after the first present date acquired by the license server;

discriminating, in response to receiving a license acquiring request, that the usage starting date contracted with the customer is not after a second present date acquired by the license server; and transmitting the second license to a customer network environment, when it is discriminated that the usage starting date contracted with the customer is not after the second present date acquired by the license server, in the image forming apparatus:

receiving the first license from the license server;

after receiving the first license, discriminating, based on the usage period of the first license, that a usage period set in the image forming apparatus does not expire on the first present date;

making the application file available for the initial setting operation, when it is discriminated that the usage period does not expire on the first present date;

after receiving the first license, discriminating, based on the usage period of the first license, that the usage period set in the image forming apparatus expires on the second present date;

transmitting a request of acquiring the second license to the license server, to acquire the second license from the license server, when it is discriminated that the usage period expires on the second present date; and receiving the second license from the license server, and making the application file available for the contract duration.

* * * * *